US009372279B2

(12) United States Patent
Mori

(10) Patent No.: US 9,372,279 B2
(45) Date of Patent: Jun. 21, 2016

(54) METHOD OF DETERMINING PETROLEUM LOCATION

(76) Inventor: Shuji Mori, Columbus, OH (US)

(*) Notice: Subject to any disclaimer, the term of this patent is extended or adjusted under 35 U.S.C. 154(b) by 4230 days.

(21) Appl. No.: 10/141,033

(22) Filed: May 7, 2002

(65) Prior Publication Data

US 2006/0039237 A1    Feb. 23, 2006

Related U.S. Application Data

(60) Provisional application No. 60/289,468, filed on May 8, 2001.

(51) Int. Cl.
*G01V 1/00* (2006.01)
*G01V 11/00* (2006.01)

(52) U.S. Cl.
CPC . *G01V 11/00* (2013.01); *G01V 1/00* (2013.01)

(58) Field of Classification Search
CPC ....................................................... G01V 1/00
USPC ................... 367/14, 15, 21; 702/3, 4, 13, 14; 324/348, 349
See application file for complete search history.

(56) References Cited

U.S. PATENT DOCUMENTS

| | | | |
|---|---|---|---|
| 2,784,370 A * | 3/1957 | Morrison | 324/323 |
| 3,126,510 A | 3/1964 | McLaughlin et al. | |
| 3,136,943 A * | 6/1964 | Slichter | 324/344 |
| 3,524,129 A | 8/1970 | Ikrath et al. | |
| 3,697,938 A | 10/1972 | Taner | |
| 3,734,489 A | 5/1973 | Milly | |
| 3,942,101 A | 3/1976 | Sayer et al. | |
| 4,381,544 A | 4/1983 | Stamm | |
| 4,507,611 A | 3/1985 | Helms | |
| 4,573,354 A | 3/1986 | Voorhees et al. | |
| 4,678,911 A | 7/1987 | Sundberg et al. | |
| 4,686,475 A * | 8/1987 | Kober et al. | 324/349 |
| 4,748,448 A | 5/1988 | Thompson | |
| 4,812,825 A | 3/1989 | Kennedy et al. | |
| 4,864,127 A | 9/1989 | Brame | |
| 4,904,942 A | 2/1990 | Thompson | |
| 4,945,249 A | 7/1990 | Grant et al. | |
| 5,148,110 A * | 9/1992 | Helms | 324/323 |
| 6,087,833 A * | 7/2000 | Jackson | 324/348 |
| 6,414,492 B1 * | 7/2002 | Meyer et al. | 324/344 |

OTHER PUBLICATIONS

Bomze et al, "Tornado-induced waves in a basin", 1975, 3rd ASCe & Delaware Univ. Civ. Engineering in the Oceans Conf., vol. 1, pp. 96-116, Abstract only herewith.*

(Continued)

*Primary Examiner* — Ian J Lobo
(74) *Attorney, Agent, or Firm* — Philip J. Pollick

(57) ABSTRACT

The probable location of petroleum deposits is determined by identifying a severe-weather-inducing site from severe weather such as mesocyclones, tornados, funnels aloft, wall clouds or supercells, water spouts, and a high density of multiple lightning ground strikes. Typically the severe-weather-inducing site is located by identifying the initial appearance of the tornado vortex signature in modern Doppler radar or monitoring the severe weather, recording data as to its position and its velocity and acceleration with respect to the ground or water surface if it is moving, and determining the inducing site from such data. The occurrence of multiple severe weather sites in a dense pattern is also used to determine the probable location of petroleum deposits.

23 Claims, 14 Drawing Sheets

(56) References Cited

OTHER PUBLICATIONS

MacGorman, D.R.. et al., "Lighting Rates Relative to Tornadic Storm Evolution on May 22, 1981" Journal of the Atmospheric Sciences, vol. 46, No. 2 (Jan. 15, 1989), pp. 221-250.

Calhoun, G.G., "How 12 Geochemical Methods Fared in GERT Project in Permian Basin" Oil and Gas Journal, May 13, 1991, pp. 62-68.

Tompkins, R., "Direct Location Technologies: A Unified Theory" Oil and Gas Journal, Sep. 24, 1990), pp. 126-134.

Koger, D.G. at al., "Remote Sensing Method Works in North Texas Producing Area" Oil and Gas Journal, Aug. 27, 1990, pp. 51-53.

Fujita, T., "A Detailed Analysis of the Fargo Tornadoes of Jun. 20, 1957" US Department of Commerce, Weather Bureau, Research Paper No. 42, Dec. 1960.

Davies-Jones, R., "Tornadoes" Scientific American, Aug. 1995.

"Tornado Safety—Surviving Nature's Most Violet Storms with Tornado Statistics for 1953-1980" U.S. Department of Commerce, National Oceanic and Atmospheric Administration, National Weather Service.

Tyler. N. et al., "Oil accumulation, production characteristics, targets for added recovery in Texas reservoirs-1" Oil & Gas Journal, Feb. 25, 1985, pp. 123-133.

Self, G. A., "Lockhart Crossing field: New Wilcox trend in southeastern Louisiana" Oil & Gas Journal, Aug. 18, 1988, pp. 81-88.

Chenoweth, P.A., "Hydrocarbon distribtuion: Ouachita overthrust belt" Oil & Gas Journal, Jul. 22, 1985, pp. 122-129.

* cited by examiner

Tornado occurrence (1950-1998) is widely distributed throughout oil-bearing Appalachian fold-mountainous West Virginia, despite of its uneven topographic characteristics.

Tornado Generation over Gas Field

Western Pennsylvania Area

Tornado Generation and Oil-Gas Deposits in Eastern Kansas

METHOD OF DETERMINING PETROLEUM LOCATION

CROSS REFERENCE TO RELATED APPLICATIONS

This application claims the benefit of U.S. Provisional Application No. 60/289,468 filed on May 8, 2001, all of which are incorporated here by reference as if completely written herein.

BACKGROUND OF THE INVENTION

1. Field of the Invention

The present invention relates to a method for determining the probable location of subterranean oil and gas deposits. More particularly, it relates to a method for determining the probable location of oil and gas deposits using severe weather phenomena such as tornados and associated phenomena to identify the location of subterranean petroleum deposits.

2. Background

Methods of determining oil and gas location are classified as either geophysical or geochemical methods. Geophysical methods are deductive and symptomatic in nature and are characterized by structural or lithological features such as sedimentary rock and subsurface and surface structural strata and density. Seismic refraction and reflection, magnetic anomalies, gravitational variations, and scanning echo sounding analysis are some of the techniques used in geophysical prospecting. For example, Helms (U.S. Pat. No. 4,507,611) discloses that oil and gas prospecting can be carried out by analysis of variation in the earth's vertical electric current and its spectrum modulations which are caused by the existence of surface and subsurface, natural and manmade, objects and deposits.

Geochemical methods typically are inductive and are characterized by phenomena that are directly or indirectly caused by leaks and seepage of hydrocarbons from underground strata or the ocean floor. Many of the geochemical methods require sampling and chemical analysis of 1) seeped oil and gas in many forms including vapor, liquid, and solids, aerosols, and suspensions and 2) organic matter, biochemical materials and organisms in the soil, water, seawater, or air near the ground surface. The detection and analysis of these and other geochemical-related phenomena can be carried out with remote sensing devices on satellites, airplanes, or marine vehicles. Numerous articles have been published and patents granted on the use of geochemical methods for the determination of the location of oil and gas deposits. These commonly used geochemical technologies employ methods to access prospecting information directly from sampling and analysis of hydrocarbon components in air, aerosols, water, and soil. For example, Milly, in U.S. Pat. No. 3,734,489 discloses a method for determining petroleum location using wind-borne gaseous hydrocarbons.

Recently, a number of efforts that correlate the occurrence of oil and gas deposits with natural phenomena. These methods use correlation studies that indirectly determine petroleum location with certain naturally occurring phenomena. Sundburg, in U.S. Pat. No. 4,678,911, Brame in U.S. Pat. No. 4,864,127, and Grant et al. in U.S. Pat. No. 4,945,249 have developed remote sensing technology for use with Landsat satellites for the detection of hydrocarbons as so-called "bright spots" by processing spectral pixel signals reflected from the earth's surface. Calhoun has carried out a comparative study on a number of geochemical exploration methods given in "How 12 geochemical methods fared in GERT project in Permian basin," *Oil and Gas Journal*, May 13, 1991, pp. 62-68.

Tompkins sets forth a unified model to explain many of the technologies used in petroleum exploration. These technologies include: 1) direct hydrocarbon-leakage determinations, 2) surface ion movement of carbonate and uranium, thorium, calcium, sulfur, iron, iodine, potassium, nickel, copper and zinc based ions to form surface halos about the petroleum deposit, 3) Landsat and high altitude photographs to determine, tonal, vegetation, drainage and erosional anomalies, 4) induced polarization phenomena, 5) telluric and magnetic electrical telluric patterns, 6) earth radiation analysis (radiometrics) as determined from, for example, soil contaminant patterns of uranium, thallium, bismuth, etc. and radon outgassing rates, and 7) micromagnetic phenomena (magnetic horizontal gradient anomalies). The Tompkins' model is based on a known zone of negative charge surrounding a petroleum deposit, upward leakage of ions and gas from the deposit, and a redox cell established as a result of the influx of oxygen through the land surface above the petroleum deposit. *Oil & Gas Journal*, Sep. 24, 1990, pp 126-134.

As also discussed by Tompkins, the exploration of oil and gas is expensive. Current industry statistics show that the success rate for wild-cat drilling based on geophysical methods is about 1 in 8 with the exploration and drilling costs adding $16-22 to the price of a barrel of oil. The elimination of dry prospects prior to large drilling expenditures is a serious matter in the industry. Some geochemical techniques are said to increase the success rate from 1 in 8 to 1 in 3 by eliminating dry prospects. However, even at this rate, exploration and drilling costs add about $6-9 to the price of a barrel of oil. A less costly and more accurate way to eliminate dry prospects prior to the expenditure of large sums for drilling continues to be a critical and long felt need in the petroleum industry.

In the seemingly unrelated area meteorology, one of the most challenging problems has been the search for an explanation for cause of tornado and tornado-like phenomena. Although the occurrence and weather conditions surrounding tornado-like phenomena has been well studied, there currently is no explanation as to why tornadoes are formed. As Dr. Robert Davis-Jones states in the August 1995 issue of *Scientific American* (page 56), "Despite understanding well how large-scale rotation develops at middle and low levels of a mesocyclone, we have yet to pin down why tornadoes are formed." Although some researchers have attempted to explain tornadoes on the basis of a surface friction theory, Dr. Davis-Jones notes that "The friction theory does not explain, however, why a tornadic vortex signature up in the clouds sometimes foreshadows the touchdown of a tornado by 10 to 20 minutes."

One of the objects of the present invention is to establish the correlation between severe weather such as tornadoes with underground petroleum deposits.

Another object of the present invention is to establish a site for further petroleum exploration using the origin of the severe weather, that is, the severe-weather inducing site as the location of the severe weather.

Another object of the present invention is to establish an area of highest severe weather origins as a probable petroleum deposit location.

Another object of the present invention is to take advantage of modern meteorological methods such as Doppler radar to determine the initial appearance of a tornado vortex signature as the origin of severe weather.

Another object of the present invention is to provide an accurate and effective method of oil and gas exploration.

Another object of the present invention is to provide a low cost method of oil exploration.

SUMMARY OF THE INVENTION

To accomplish these objectives, this invention features the use of severe weather to determine petroleum location. To accurately and effectively locate the petroleum deposit, the origin or inducing site of the severe weather is determined using known techniques in the meteorological arts. The use of severe weather has the advantage of using severe weather monitoring and recording equipment that has already been developed and is widely used for meteorological purposes unrelated to petroleum exploration. Such severe weather monitoring and recording equipment includes, but is not limited to, Doppler and L-band radar, Doppler lidar, based on light rather than microwave technology, visual recording means such as movie cameras and analog and digital recording systems for recording the radar scans, and atmospheric sound sensors. NEXRAD (NEXt Generation Weather RADar) exemplifies current technology in severe weather detection and location.

As used here, the term "petroleum" includes, oil, natural gas, and other gaseous and liquid hydrocarbon species. The term "severe weather" is limited to those weather phenomena associated with tornado-like weather and which tends to be localized in nature and of short duration. Such weather phenomena include 1) wall clouds which are also referred to as supercells, 2) funnels aloft, 3) tornados, 4) water spouts, 5) multiple lighting ground strikes in a small area, 6) mesocyclones and similar phenomena that originate from conditions above subterranean petroleum and natural gas deposits.

Multiple lightning ground strikes are referred to here as multiple, high-density lightning ground strikes. The term "severe weather" does not include high winds, blizzards, straight-line high-velocity wind, torrential rains, hail, and other phenomena that are part of normal continental weather patterns and, more importantly, which do not trace their origin to conditions that are prevalent above subterranean oil and gas deposits. As used here, the terms "tornado" and "water spout" specifically refer to a tornado that has touched down and made contact with the ground or water, respectively. Typically a water spout is a weak tornado that forms over water. A tornado that has not touched down is referred to as a "funnel aloft."

Generally the severe weather that is used to locate the petroleum-related, severe-weather-inducing surface site can be divided into two categories, static and moving severe weather. Moving severe weather includes wall clouds (supercells), funnels aloft, tornados and water spouts. The term moving is used to denote severe weather that is capable of movement with respect to the ground or water surface. However, because such weather is classified as moving does not limit it to a moving state. In fact, it can exist in a static or non-moving state. On the other hand, the term static severe weather designates a phenomenon that occurs in one place with respect to the ground surface. Such phenomena includes and is exemplified by lightning ground strikes. It is to be understood, that the term static is used with respect to the ground site over which the phenomenon takes place. However, it is to be noted that such phenomena are often associated with other phenomena which are by no means static such as the churning, turbulent air masses in which they arise.

The monitoring and recording of severe weather is a well developed art whose aim has been to predict the path of such weather so as to warn those who might be in its path and injured by it. Prior to this invention, the determination of the source of severe weather has been used only as a predictive tool to give warning of impending loss to life and property as a result of the ensuing path of the resulting destructive force. The emphasis has been on predicting the destructive path of the severe weather. In the present invention, the prime feature and focus is the use of monitoring and recording technology to determine the origin of the severe weather.

Based on a conventional statistical analysis of petroleum reserves and tornado occurrence on a national, state, and county level, it has been determined that such severe weather occurrences are a very strong predictor of subterranean petroleum occurrence. In view of this strong correlation, it is not at all surprising the Great Red Spot of Jupiter, a gigantic and violently turbulent vortex, has been found to contain high concentrations of methane.

In determining the location of severe-weather inducing site, i.e., the origin of moving severe weather, current technology allows for the direct observation of such sites as a tornado vortex signature which is a small scale anomalous region of high shear associated with tornado phenomena. When such direct observation of the initial appearance of the tornado vortex signature is not made, data on the position, velocity and acceleration of the moving severe weather (tornado and tornado-associated phenomena) is extrapolated to its origin using standard mathematical techniques which may be implemented using digital computer techniques and programs. After identifying the presence of severe weather using various techniques including radar and satellite observation, moving severe weather is typically monitored using networks of Doppler radar or lidar units. Data from such monitoring are recorded in a variety of formats including photographic, analog and digital representations.

Static severe weather, such as lightning strikes, are monitored using a variety of techniques including L-band radar, Doppler radar and atmospheric sound sensors. Data for the points of lighting ground strike are typically determined with triangulation techniques. Once the data for the ground strike positions have been recorded, the unit ground area of highest ground strike location density is determined using standard density analysis techniques.

Having determined the severe-weather-inducing site as a site for further petroleum exploration, the presence of petroleum is determined typically by drilling a well at the site. Prior to such drilling, it is often desirable to confirm the likelihood of petroleum presence using other petroleum exploration techniques such as elemental and hydrocarbon analysis, radiometrics, seismic reflection and refraction, magnetic anomalies, and similar techniques such as those noted above in the Sep. 24, 1990 issue of the *Oil and Gas Journal*.

The foregoing and other advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

Figure 1:
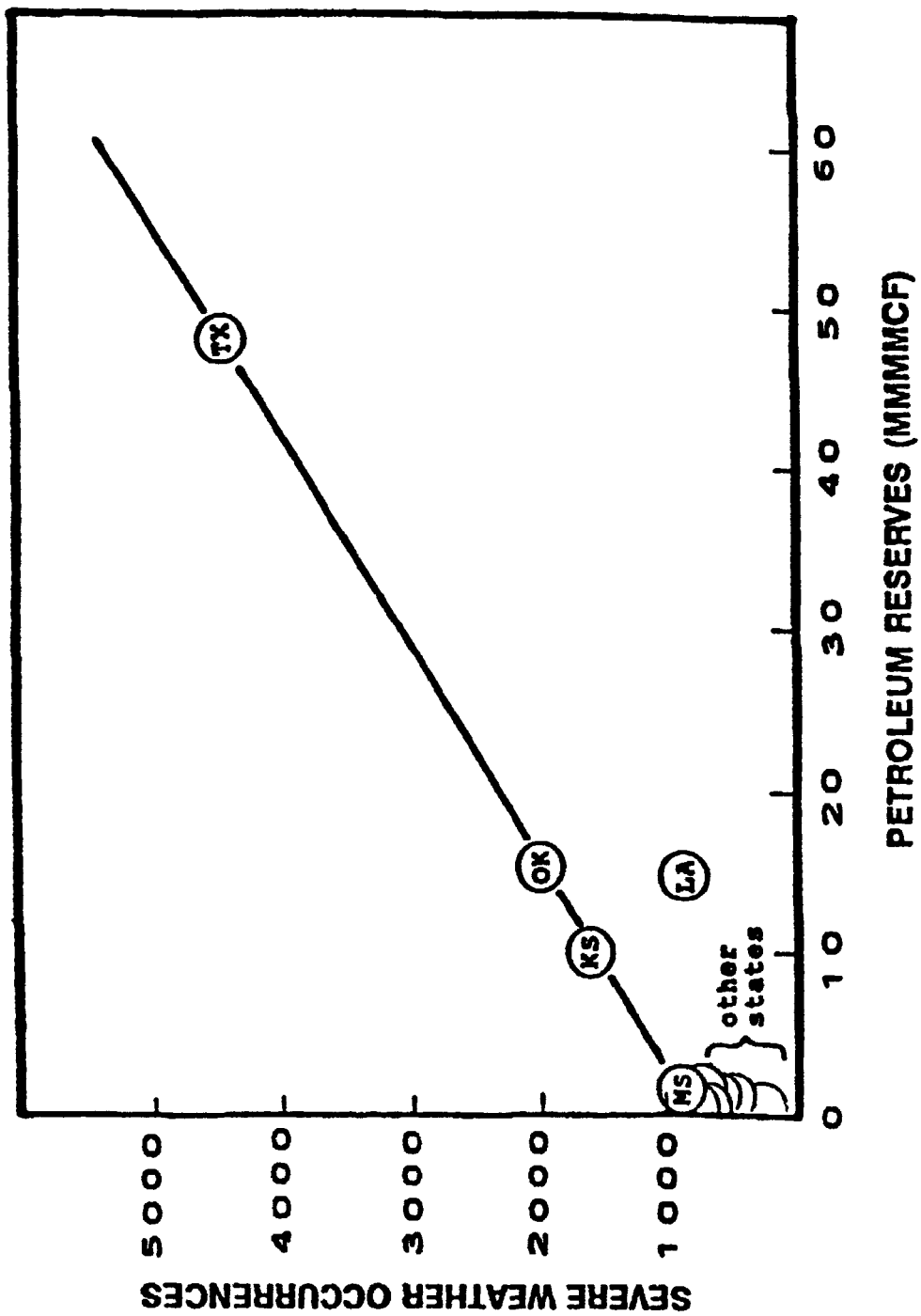
FIG. 1 is a graphical correlation between severe weather occurrences (1950-1988) and natural gas reserve estimates.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

FIG. 1 shows the correlation of severe weather occurrences as reported in the monthly publication, Storm Data, National Oceanic and Atmospheric Administration Monthly, for the period from 1950 to 1988 with 1988 natural gas reserve estimate data found in the DOE/EIA-0216(88) U.S. Crude Oil, Natural Gas, and Natural Gas Liquids Reserves report on a state-wide basis. The correlation includes states in the South and Midwest between the Appalachian and Rocky Mountains. FIG. 1 serves only as a general indicator of the severe weather/petroleum correlation since data is often not complete or otherwise available for many states in this region. For example, petroleum reserve data is not available for Georgia, Illinois, Indiana, Iowa, Minnesota, Nebraska, South Dakota, Tennessee, and Wisconsin. Likewise, severe weather data often is not available for mountainous, desert and other unpopulated regions since severe weather incidents have not been electronically monitored in the past and therefore are based often only on human observation. In spite of these difficulties, the correlation in FIG. 1 is remarkably good at illustrating the increasing number of tornado occurrences in areas with higher petroleum reserves. Specific numerical data for both severe weather and petroleum reserves on a state by state basis are set forth in Table I.

As further evidence of the validity of the correlation between severe weather and petroleum deposits, a detailed analysis of the state of Texas was carried out on a county by county basis. Of the 254 counties in Texas, forty counties have recorded more than twenty-eight occurrences of severe weather in the period from 1950 to 1989.

Since oil and natural gas reserve data are not publicly available at the county level in Texas, it was not possible to correlate severe-weather occurrences directly with hydrocarbon deposits. However, several well-known hydrocarbon-associated geological formations have been reported in the literature. Tyler et al, Oil and Gas Journal, (Feb. 25, 1985) pages 123-132, reports that the oil and gas reserves in Texas are highly accumulated in (1) the East Texas Salt-Structure and the Houston Salt-Structure regions, (2) the Vicksburg Salt Zone and Frio-Salt Zone and (3) the West Texas Basins. Chenoweth, Oil and Gas Journal, (Jul. 22, 1985) pages 122-130, has reported substantial oil and gas reserves along the Ouachita Overthrust Belt.

TABLE 1

Tornado/Natural Gas Reserves by State

| State | Number of Tornadoes | Natural Gas Reserves [$\times 10^9$ SCF] |
|---|---|---|
| Texas | 4477 | 47.12 |
| Oklahoma | 1991 | 15.50 |
| Kansas | 1617 | 9.97 |
| Mississippi | 853 | 1.24 |
| Alabama | 771 | 0.75 |
| Arkansas | 752 | 1.93 |
| Kentucky | 286 | 0.66 |
| Louisiana | 821 | 11.05 |
| Michigan | 594 | 1.22 |
| North Dakota | 660 | 0.54 |
| Ohio | 492 | 1.33 |

Figure 2:
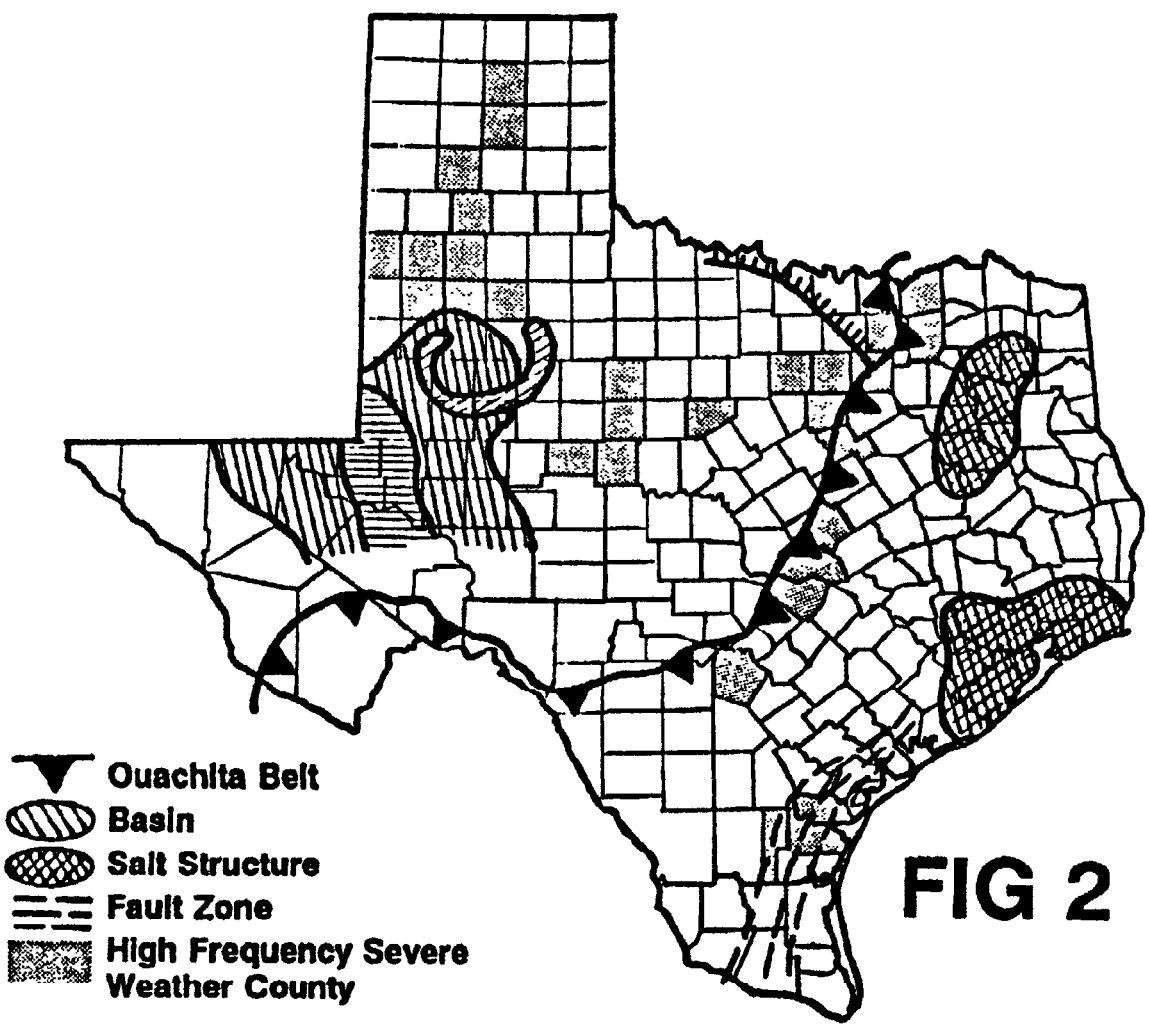
FIG. 2 shows the correlation between high, severe-weather occurrence Texas counties with well-known, major, hydrocarbon-associated geological formations.

When these major geological formations are superimposed on a county map emphasizing counties of high severe weather occurrence as has been done in FIG. 2, the association between severe weather occurrences and geological formation is readily apparent. Although there are some counties with high numbers of severe weather occurrences that are not associated with major geological formations, these counties are felt to be good areas for future oil exploration and may be associated with lesser geological formations not noted in the two referenced articles.

Figure 3:
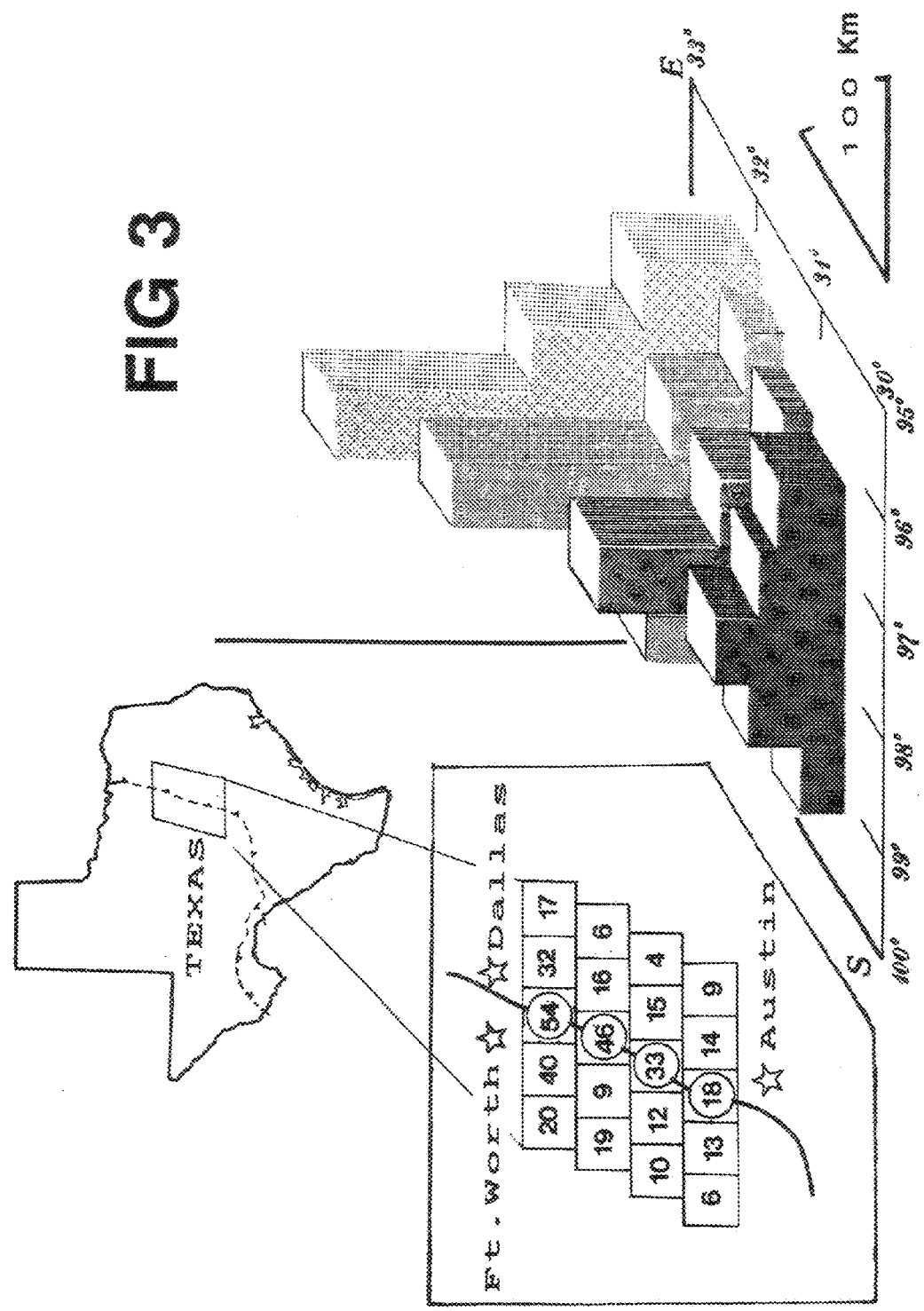
FIG. 3 shows the distribution of severe weather in counties over and adjacent to the Ouachita Belt in the area between Austin and Dallas/Fort Worth.

To further illustrate the association of severe weather occurrences with subterranean geologic formations, the number of incidents of severe weather in counties over and adjacent to the petroleum associated Ouachita Belt are shown in FIG. 3 in the region between Austin and Dallas/Fort Worth. It is noted that the surface topology in this area is flat and without visible topographical significance both over and for a significant distance on each side of the Belt. In spite of this flat topology, the number of severe weather incidents directly above the Ouachita Belt is significantly higher than the number of incidents in the areas (counties) immediately adjacent to the Ouachita Belt.

Although the data presented in FIGS. 1-3 show a good overall association between severe weather incidents and petroleum deposits and associated geological formations, it is desirable to know whether an opposite association also exists. That is, is there an absence of severe weather in areas where there are no known petroleum deposits? In view of the widespread discovery of petroleum in most states and the lack of intense exploration in many areas, it is difficult to find areas where no known reserves have been determined. However, Colorado presents some unique underground topology and widespread exploration data that answers this question.

Figure 4:
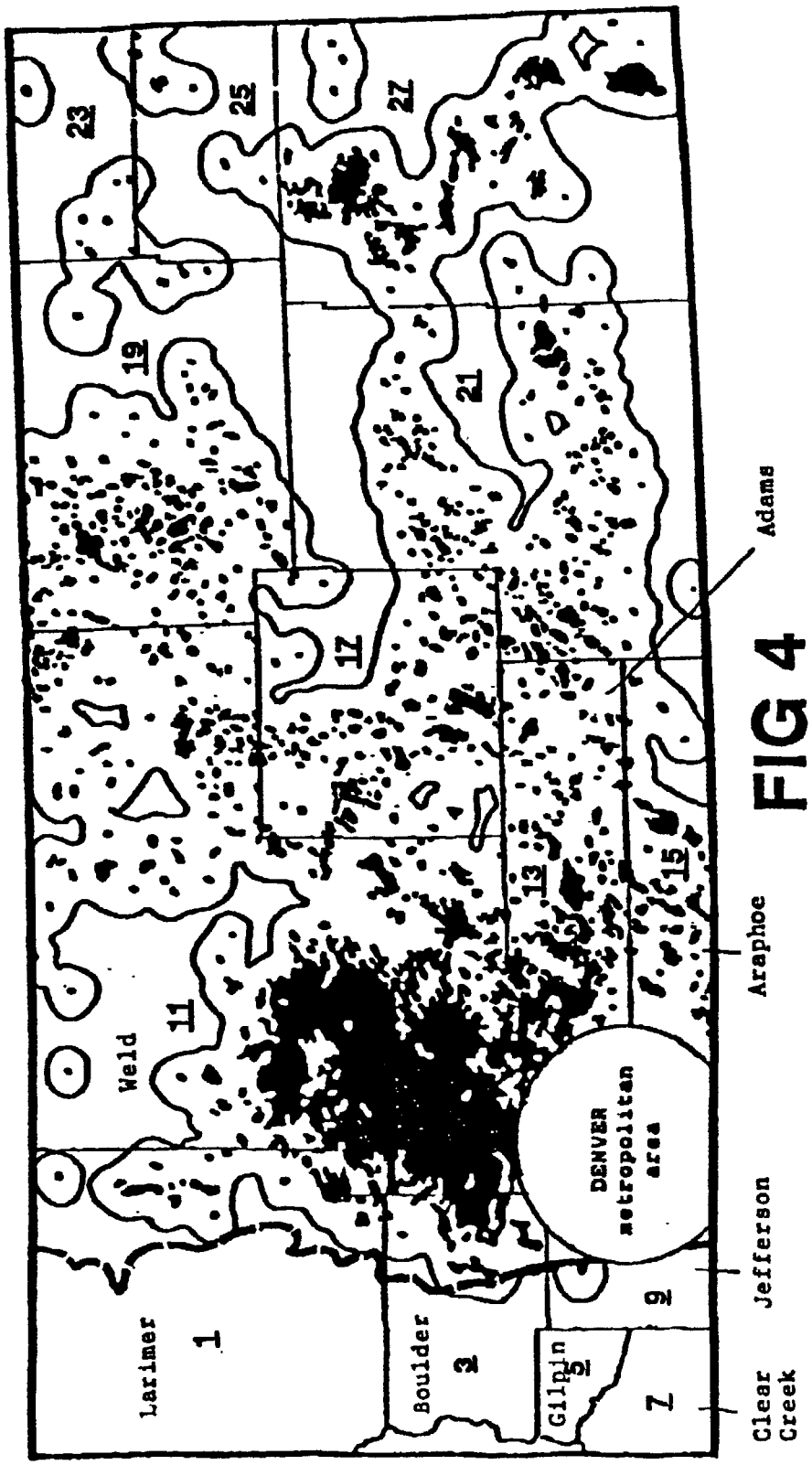
FIG. 4 gives the oil and gas deposit distribution for several Colorado counties near Denver with each of the counties being divided into petroleum-rich and petroleum-lean areas. These data were used in the statistical analysis performed by the Statistical Consulting Service of The Ohio State University.

As seen in FIG. 4, the area on a line generally east of Denver is quite rich in petroleum while the area to the west of Denver is virtually devoid of petroleum. From a geological point of view, one notes that the area east of Denver is essentially formed in horizontal strata typical of those associated with petroleum deposits while the area to the west of Denver has vertical strata that permits the ready escape of petroleum deposits. As such, the discovery of oil in the area west of Denver has been an indeed rare occasion.

The Denver area itself has been excluded from this analysis in view of the lack of exploration activity in this and most metropolitan areas. Each county in FIG. 4 has been divided into petroleum-rich and petroleum lean areas and the number of severe weather incidents determined in each area. The number of incidents of severe weather in the petroleum rich and petroleum-lean areas of each county is set forth in Table II. As can be seen, the area to the west of Denver with no known petroleum deposits has virtually no severe weather activity. A total of only 4 severe weather incidents have been recorded in this area in more than forty years. On the other hand, Weld county (11), with the greatest density of petroleum deposits, also has the greatest number of severe weather incidents (105) associated with those deposits. Even in the generally petroleum-rich counties to the east of Denver, one sees a strong correlation between severe weather or lack thereof with petroleum-rich and petroleum-lean areas of each of these counties.

Figure 5:
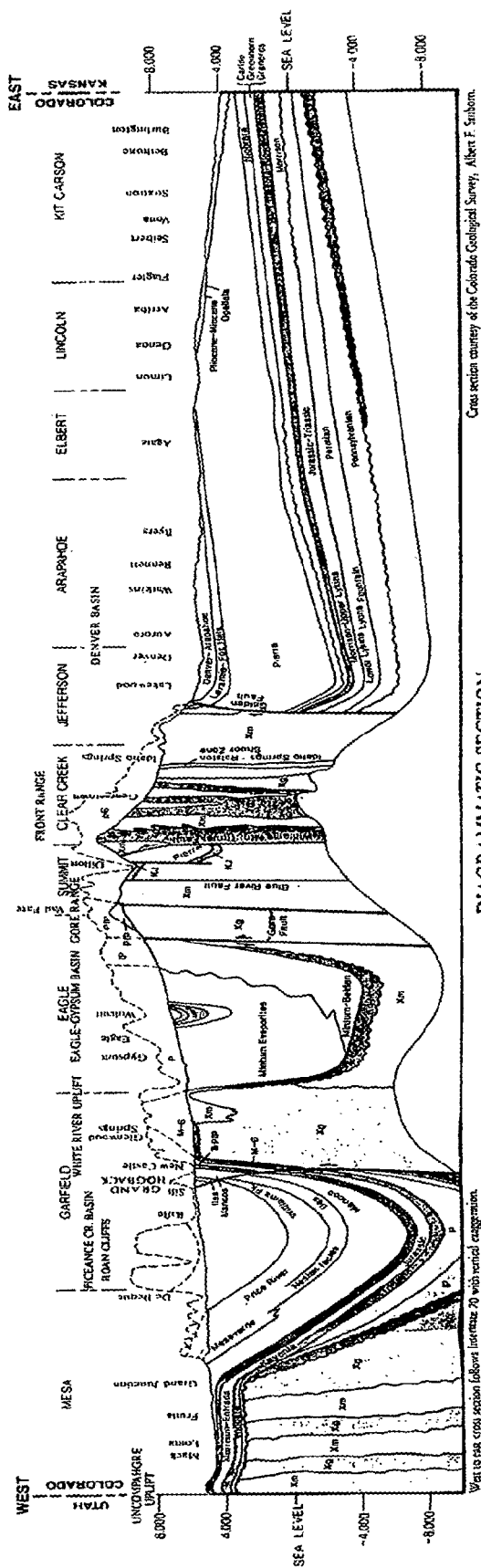
FIG. 5 is a cross section through Colorado that illustrates the geological formations found in the cross-sectional counties.

To aid further in an understanding of this data, a diagrammatic cross-section of the subsurface topology for Colorado is given in FIG. 5. FIG. 5 shows that the subterranean strata in eastern Colorado are of a horizontal nature while in western Colorado, the subterranean strata are of vertical orientation. The change from horizontal to vertical strata occurs in Jefferson County (9 in FIG. 4). Clear Creek county (7) is entirely over vertical strata and that Arapahoe County (15) is entirely over horizontal strata. As seen in FIG. 4, the western vertical strata are divided from the eastern horizontal strata by the Golden Fault Line.

In referring to FIG. 4 and Table II, it is observed that very few tornadoes have appeared in areas above the petroleum-barren, vertical strata area of Colorado, specifically,

| | |
|---|---|
| Larimer County (western portion) (1) | 4 tornadoes |
| Boulder County (western portion) (3) | 0 tornadoes |
| Gilpin County (5) | 0 tornadoes |
| Clear Creek County (7) | 0 tornadoes |
| Jefferson County (western, non-Denver area) (9) | 0 tornadoes |

Figure 6:
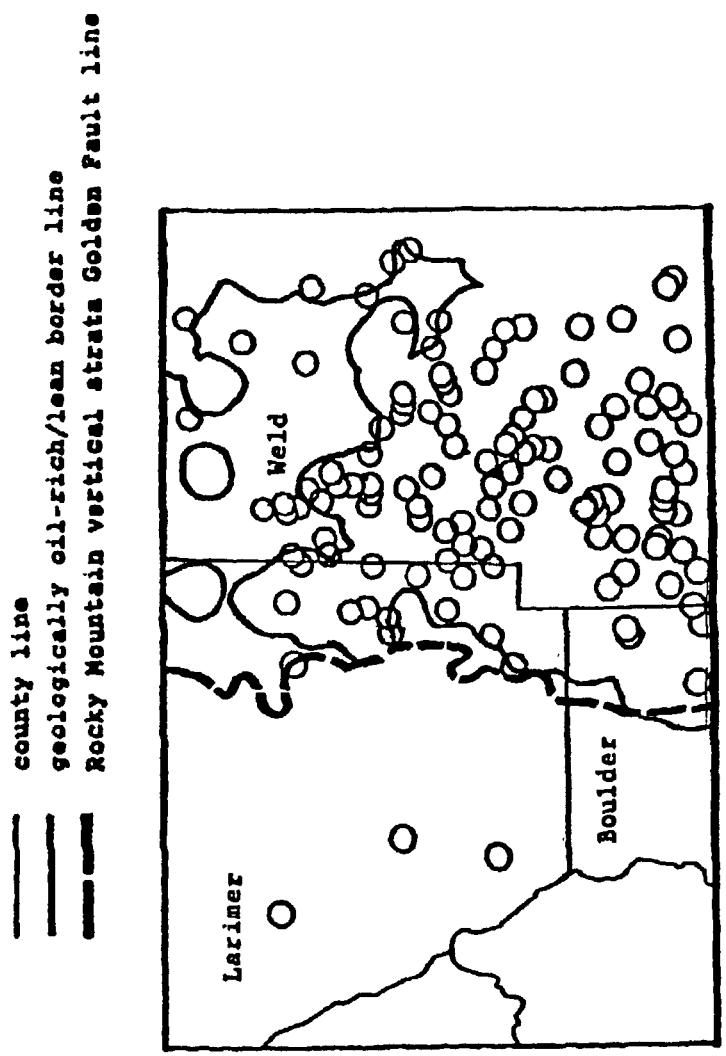
FIG. 6 illustrates tornado activity in oil-rich and oil-lean Colorado counties at the Golden-Fault line.

In marked contrast to the vertical strata, tornado activity increases markedly above the horizontal strata, especially over areas of known petroleum deposits. As shown in FIG. 6 (each tornado sighting indicated with a circle) and Table II of the specification, those areas above known petroleum deposits have a high incidence of tornado activity, specifically,

| | |
|---|---|
| Larimer County (1, eastern portion) | 8 tornadoes |
| Weld County (11) | 105 tornadoes |
| Boulder County (3, eastern portion) | 7 tornadoes |
| Adams County (13) | 49 tornadoes |
| Arapahoe County (15) | 20 tornadoes |

Figure 7:
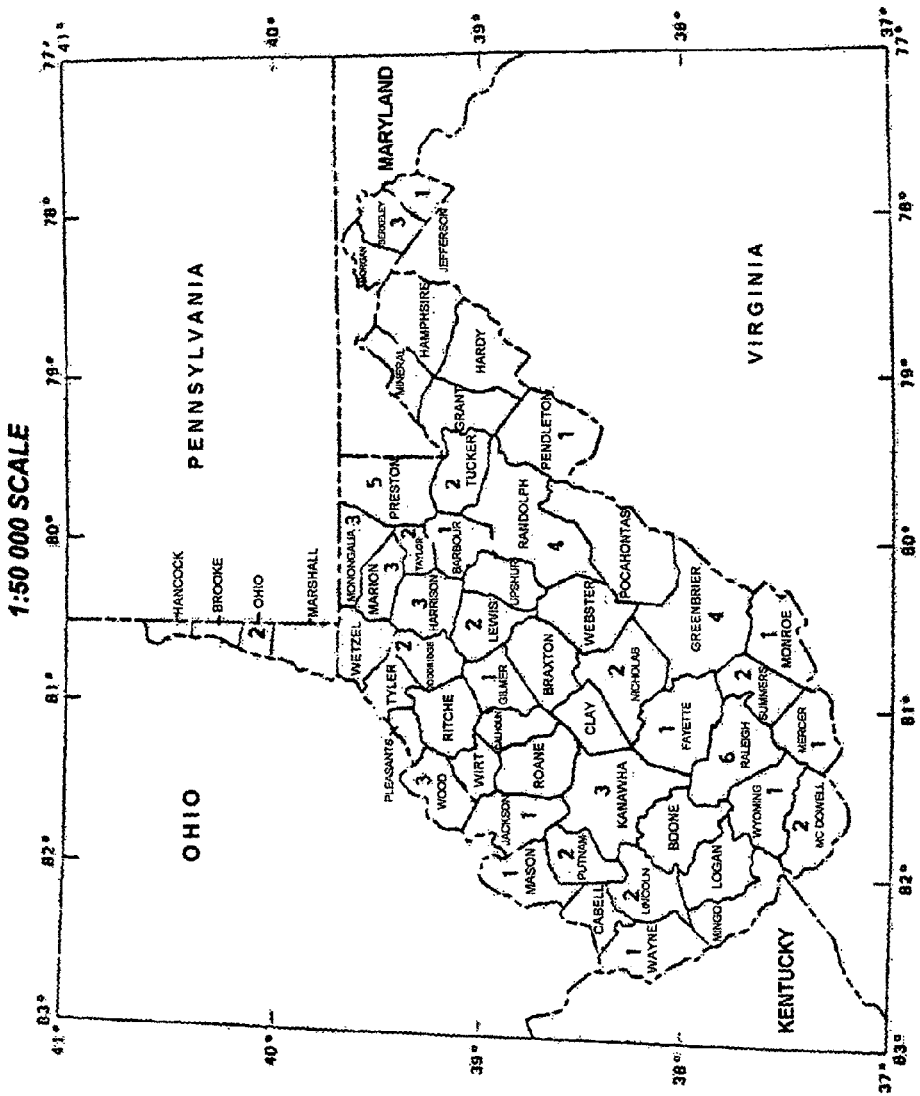
FIG. 7 gives the tornado distribution by county for West Virginia.
Figure 9:
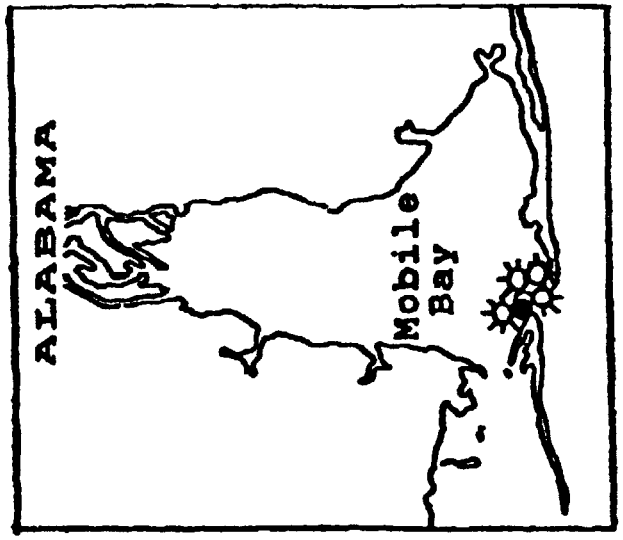
FIG. 9 shows a water-spout origin and associated petroleum well in Mobile Bay, Ala.
Figure 8:
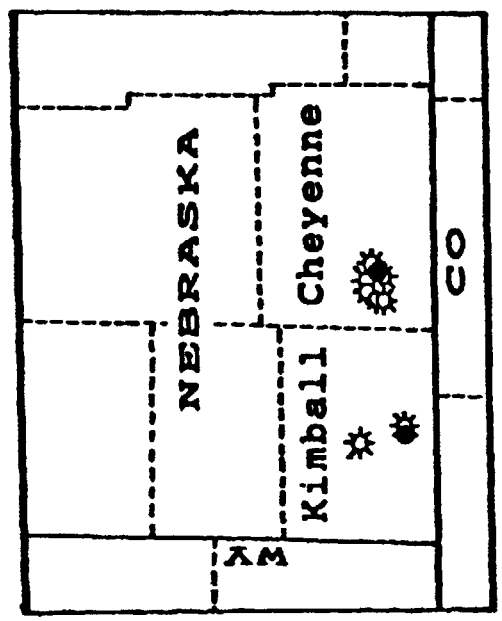
FIG. 8 gives tornado origin locations and associated petroleum wells in Kimball and Cheyenne counties, Nebraska.

Although one might conclude that the lack of tornado activity is based on the mountainous surface topology to the west of the Golden Fault Line, it is pointed out that tornadoes are observed over oil deposits in other mountain areas of the county. Specifically West Virginia is located entirely in the Appalachian Mountain Range and is known to have about two thirds the amount of petroleum ($2.06 \times 10^9$ SCF gas and $0.076 \times 10^9$ bbl oil) as Colorado. Despite the mountainous topography of West Virginia, about sixty five tornadoes have been observed in this state. This is in contrast to the lack of tornado activity in the Colorado mountain areas where there are no oil deposits. FIG. 7 gives the number of tornadoes by county for West Virginia.

Tornadoes typically occur in the afternoon (3-7 pm) with the largest numbers occurring in the months of May-June. These temporal distributions are associated with "warming periods" and are fully consistent with the mechanisms set forth below. These mechanisms are based generally on the upward movement of hydrocarbon materials to form charged air masses. Consistent with these mechanisms, one would expect the greatest occurrence of tornadoes during warming periods, that is, in late afternoon and in the warming spring and summer months. Although one might conclude that tornadoes and associated severe weather might not be observed in colder climates such as Alaska, tornadoes do occur. One of the problems with Alaska is that although there are large oil fields, the National Weather Service does not monitor the weather in much of the remote area of Alaska on a routine basis. As such, severe-weather data is sparse, not because such weather does not occur, but because no one routinely monitors and records its presence.

From these data, it is quite apparent that one can increase the prospects for finding petroleum by selecting a surface area of land or water or both and monitoring this area for occurrences of severe weather. Monitoring is especially accurate when carried out with a network of radar units such as featured in the NEXRAD system. Having determined several occurrences, one can find the source of each of these occurrences using established meteorological methods and establish one or more areas of high severe weather density within the selected land area. Having determined the area of high severe weather density, the presence of petroleum with in the high density area can be determined using techniques such as soil sampling or actually drilling an oil well. As is evident from FIG. 4 and Table II, the chances of finding petroleum would be considerably increased. To further increase the prospect of finding petroleum, additional data such as seismic data could be referenced to determine the exact drilling site.

Well established methods have been developed in the meteorological arts for the determination of the source or origin of severe weather. For example, to locate a severe-weather-inducing site associated with lightning strikes (static severe weather), the area of highest ground strike location density is determined, that is, the unit area in which the greatest number of lightning strikes have occurred. This involves monitoring for each lightning ground strike as to its ground strike location. This which is typically done with L-band and Doppler radars and atmospheric sensors. Data for the site of each ground strike is determined using triangulation techniques and recorded with respect to its ground strike location and the ground area of highest ground strike location density determined using standard statistical techniques. Methods for the determination of the location of lightning ground strikes are illustrated in MacForman et al, "Lightning Rates Relative to Tornadic Storm Evolution on 22 May 1981," *Journal of the Atmospheric Sciences*, vol 46, no 2 (Jan. 15, 1989), pp. 221-250.

Unlike the location of the petroleum-related, severe-weather-inducing site from multiple lightning strikes, the location of the weather inducing site from a tornado or other moving severe weather is not as straightforward. Since such phenomena are in translational movement with respect to ground or water surface, it is necessary to extrapolate from the path of such moving severe weather to its origin in order to determine the petroleum-related, severe-weather-inducing site. Typically such moving weather is monitored using Doppler radar and visual means such as movie cameras and video recording systems. Data from such monitoring is recorded and extrapolated to the point of origin of the moving severe weather. As with lightning strikes, such techniques are well known in the meteorological arts as illustrated by Fujita, T., "A Detailed Analysis of the Fargo Tornadoes of Jun. 20, 1957," US Department of Commerce, Weather Bureau, Research Paper No. 42 (December, 1960). Use of Doppler lidar and NEXRAD (network of Doppler radar units) allows the early detection of mesocyclones in which tornadoes form and gives additional precision and accuracy to the determination of the severe weather origin or inducing site.

A statistical analysis of several data sets were analyzed by the Ohio State University Statistical Consulting Service under the direction of Dr. Robert M. Leighty and is presented at the end of this section. The first set of data that were analyzed at The Ohio State University consisted of pairs of mean incidence per 100 $km^2$ of tornadoes in counties of the state of Colorado data as set forth in Table II and FIG. 4. Four separate statistical tests were performed on these data: 1) a paired t-test, 2) a t-test that allows for paired differences to be spatially correlated, 3) a sign test, and 4) a Wilcoxon signed-rank test were performed. All tests provided highly statistically significant evidence, i.e., the chance of finding tornadoes is more than 99 percent likely in petroleum rich areas than it is in petroleum lean areas. The study itself phrased the inquiry as a null hypothesis, i.e., that there was no difference in the occurrence of tornadoes in petroleum rich and petroleum lean counties. The conclusion was that this hypothesis had less an a one percent chance of occurring (P<0.01) for all four tests.

Although one might be skeptical of the results from one state, skepticism diminished substantially when data from three other states, Western Pennsylvania, Northern Texas, Louisiana, and Kansas were analyzed. For all of these states except Louisiana, the data was broken down on a county level. Sign texts confirmed that in these three data sets, there is a higher incidence of tornadoes in petroleum or gas rich areas. Here the chance of finding tornadoes in petroleum rich areas over petroleum lean areas was 99.9%, i.e., the largest P value for a null hypothesis was less than 0.001.

In addition to the above data, further data was obtained for multiple tornado sightings in a single square mile in the Texas counties of Orange, Jefferson, Brazoria, and Wharton. Assuming the tornadoes are merely random occurrences, a statistical analysis was run on this data that shows that such a pattern of tornadoes is extremely improbable. i.e., there is less an a two ten-thousandths percent chance (P=0.000169) that the tornadoes were merely a random occurrence. This further supplements the original data and clearly demonstrates that the incidence of tornadoes is associated with a petroleum-deposits and does not occur as a mere random event.

In sum, the analyzed data point to a clear association between tornadoes and petroleum. Multiple occurrences of tornadoes demonstrates that the incidence of tornadoes is

TABLE II

Severe Weather Occurrences according to Petroleum Distribution by County in Colorado State

| FIG. 4 County Number | County | Petroleum-rich area Occurrences | Petroleum-lean area Occurrences | Petroleum-rich area concentration per 100 $km^2$ | Petroleum-lean area Concentration per 100 $km^2$ |
|---|---|---|---|---|---|
| 1 | Larimar | 8 | 4 | 0.70 | 0.09 |
| 3 | Boulder | 7 | 0 | 0.93 | 0.00 |
| 5 | Gilpin | (no area) | 0 | (no area) | 0.00 |
| 7 | Clear Creek | (no area) | 0 | (no area) | 0.00 |
| 9 | Jefferson[1] | (no area) | 0 | (no area) | 0.00 |
| 11 | Weld | 105 | 8 | 1.18 | 0.37 |
| 13 | Adams[1] | 49 | (no area) | 1.66 | (no area) |
| 15 | Arapahoe[1] | 20 | (no area) | 1.40 | (no area) |
| 17 | Morgan | 20 | 2 | 0.68 | 0.44 |
| 19 | Logan | 23 | 4 | 0.66 | 0.28 |
| 21 | Washington | 26 | 2 | 0.62 | 0.08 |
| 23 | Sedgwick | 7 | 4 | 1.80 | 0.42 |
| 25 | Phillips | 7 | 7 | 1.16 | 0.60 |
| 27 | Yuma | 19 | 13 | 0.55 | 0.48 |

[1]Denver county is a highly populated area with uncertain geographical information concerning petroleum deposits and therefore has been omitted Similarly, portions of Adams (13), Arapahoe (15), and Jefferson (9) counties within the Denver area have also been omitted from this analysis.

location-specific and related to geological factors. Analysis of all of the data supports the hypothesis that the presence of petroleum is more likely to occur in areas where there is a higher incidence of tornadoes. The Tornado Occurrence Study is set forth at the end of this section. The data for Colorado is given in Table II and FIG. 4.

Figure 10:
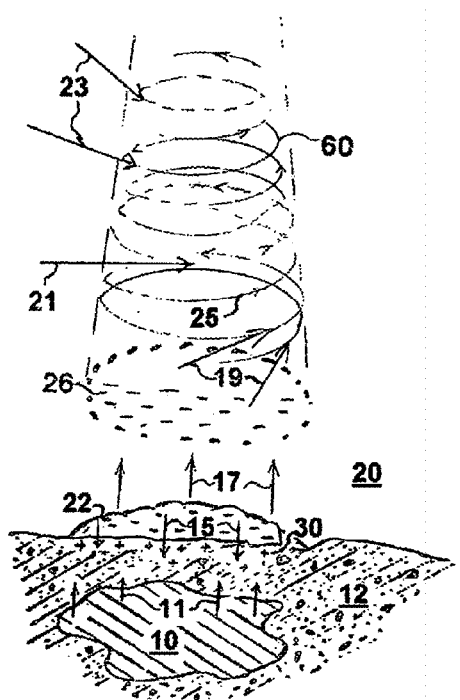
FIG. 10 is a cross-sectional schematic view showing the diffusion of gaseous products from the petroleum deposit through the ground with counter diffusion of atmospheric oxygen so as to give a redox reaction that forms an anodic surface and gaseous negative ions that emerge from the surface of the ground.

Without wishing to be bond to any particular theory, the following discussion illustrates a scientific mechanism by which petroleum deposits serve as the source of severe weather. As shown in FIG. 10, a deposit of oil and gas (petroleum) 10 in underground strata 12 promote various chemical and electrical phenomena. Hydrocarbons, especially methane, in petroleum deposit 10 are in a state of upward movement through the ground 12 into the atmosphere 20 in the form of hydrocarbon vapor or particulate matter (indicated by upward arrows 11 from deposit 10). In the course of upward diffusion through the ground strata 12, the hydrocarbons 11 enter into a redox reaction with a steady flux of oxygen 15 supplied from the atmosphere 20 in counter downward diffusion 15 through the ground 12 towards the deposit 10. This results in a formation of a positive ground surface, that is, as an anodic ground region 30 above the petroleum deposit 10. As the upwardly moving hydrocarbons enter into a redox reaction with downward diffusing oxygen, they are converted into negatively charged gaseous ions. Heat from the redox reaction and the sun cause a convective uplifting of negatively-charged air mass 22 from the ground surface as indicated by the upward arrows 17 extending from the top of negatively-charged, air mass 22. As this mass continues to rise, it is subjected to various wind currents which if from different directions which in the proper sequence can give rise to mesocyclone 60. For example, at ground level the wind is from a southerly direction 19. Progressing further aloft, the air currents progressively change to a westerly direction 21 and ultimately shift to a northerly direction 23 in the jet stream at high altitudes. This gradual shift in wind direction imparts a counterclockwise rotation 25 to the charged cloud giving rise to mesocyclone 60.

As shown in FIG. 10, the uplifted negatively-charged air mass 26 (shown in phantom) forms a huge electrical capacitor with the electron-depleted positive ground region below it. This occurrence can generate several hundred megawatts of electrical power with a potential difference of several hundred million volts between the uplifted air mass 26 and the ground region below. This formation is the petroleum-related, severe-weather-inducing site that gives rise to severe weather. Often as the rising air mass 26 continues to rise it meets with colder air to give rise to cloud formations. However it is not necessary that cloud formation take place and thus it is possible to have severe weather phenomena that exist in essentially a transparent state.

Figure 11:
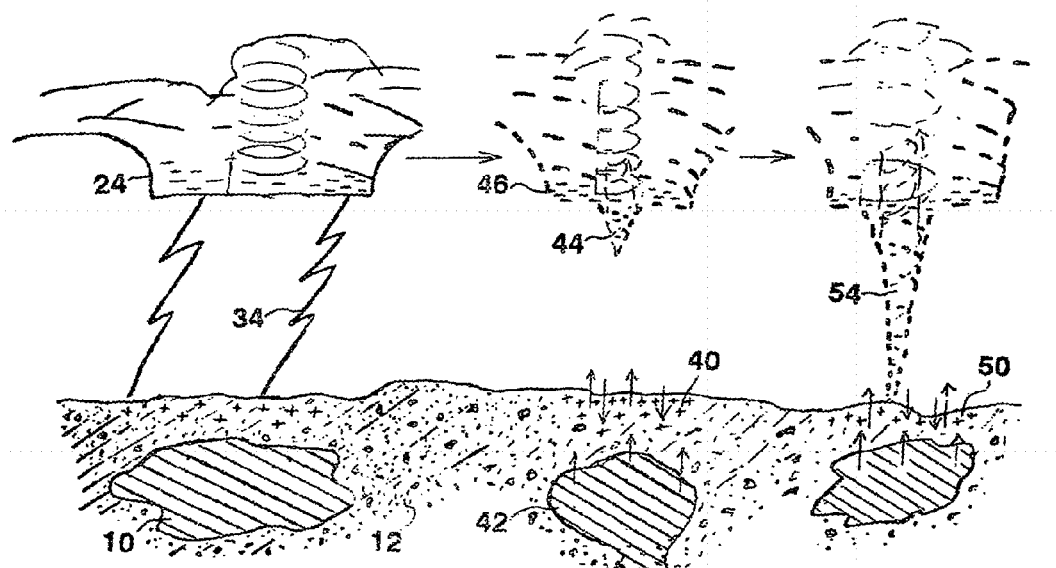
FIG. 11 shows the various forms of severe weather generated at severe-weather-inducing sites.

Referring to FIG. 11, it is seen that as the attraction between the uplifted negatively-charged air mass and the positive ground region 30 overcomes the convective uplifting forces, the negative air mass begins to be drawn to the positive ground region with the formation of a wall cloud 24. Frequently, the negative charged air mass will discharge to the positive ground anode in the form of lightning ground strikes 34. Since such lightning is attached to the positive anode ground region, such a ground region will often be the site of multiple lightning strikes 34. Thus the region above petroleum deposit 10 is the site of multiple, high-density, lightning ground strikes 34. Because the lightning ground strikes occur in a single area on the ground, they are referred to as static severe weather.

Unlike the static lightning phenomenon, which has no lateral movement, a wall cloud can undergo movement with respect to the ground surface as indicated by the rightward arrows in FIG. 11. If this moving air mass encounters a fresh positive ground region 40 formed from another petroleum deposit 42, the negatively charged cloud 46 is further drawn toward the positive region 40 to form a funnel aloft 44. On yet a third encounter with a fresh ground anode region 50, the moving negatively charged air mass may actually touch the ground in the area of positive charge 50 to form tornado 54. Tornado 54 is a tightly wound vortex of updrafting air. Although rarely more than several hundred feet across, it can occasionally exceed a mile in diameter. It rotates in a counter clockwise direction in the Northern Hemisphere and a clockwise direction in the Southern Hemisphere. The pressure in the vortex column can be up to 10% less than that of the surrounding atmosphere. As a result of this significantly reduced pressure, ground air is sucked into the base of the vortex from all directions and is rapidly pumped upward in a spiral fashion into the column.

Such sucking, pumping and spiraling motion tends to dissipate the energy of the tornado. As the energy of the tornado 54 dissipates, it is likely to recede from the ground only to be renewed in energy and touchdown again if it encounters yet another area of positive charge.

The above description is not the only way that the various manifestation of severe weather can form. Indeed it is possible that a wall cloud 24, a funnel aloft 44, a tornado 54, and multiple, high-density lightning ground strikes 34 can all occur above the same positive ground site. It is also to be noted that one formation does not require the existence of the other formations. Thus it is possible to have a tornado without a funnel aloft or a wall cloud, a funnel aloft without a wall cloud or tornado, and various other combinations.

Figure 12:
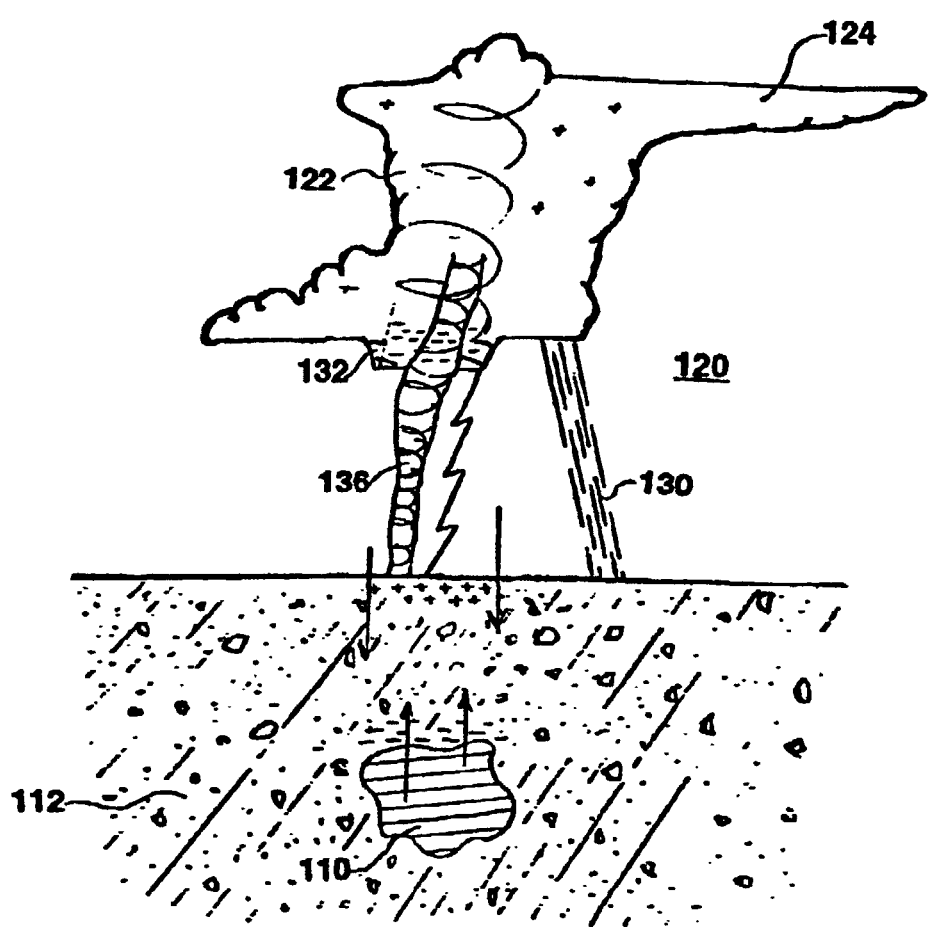
FIG. 12 is a cross-sectional schematic view showing the formation of a redox cell with a cathodic region around the petroleum deposit and an anodic region at the ground surface that induces an electrostatic dipole in a passing thunderstorm cloud.
Figure 13:
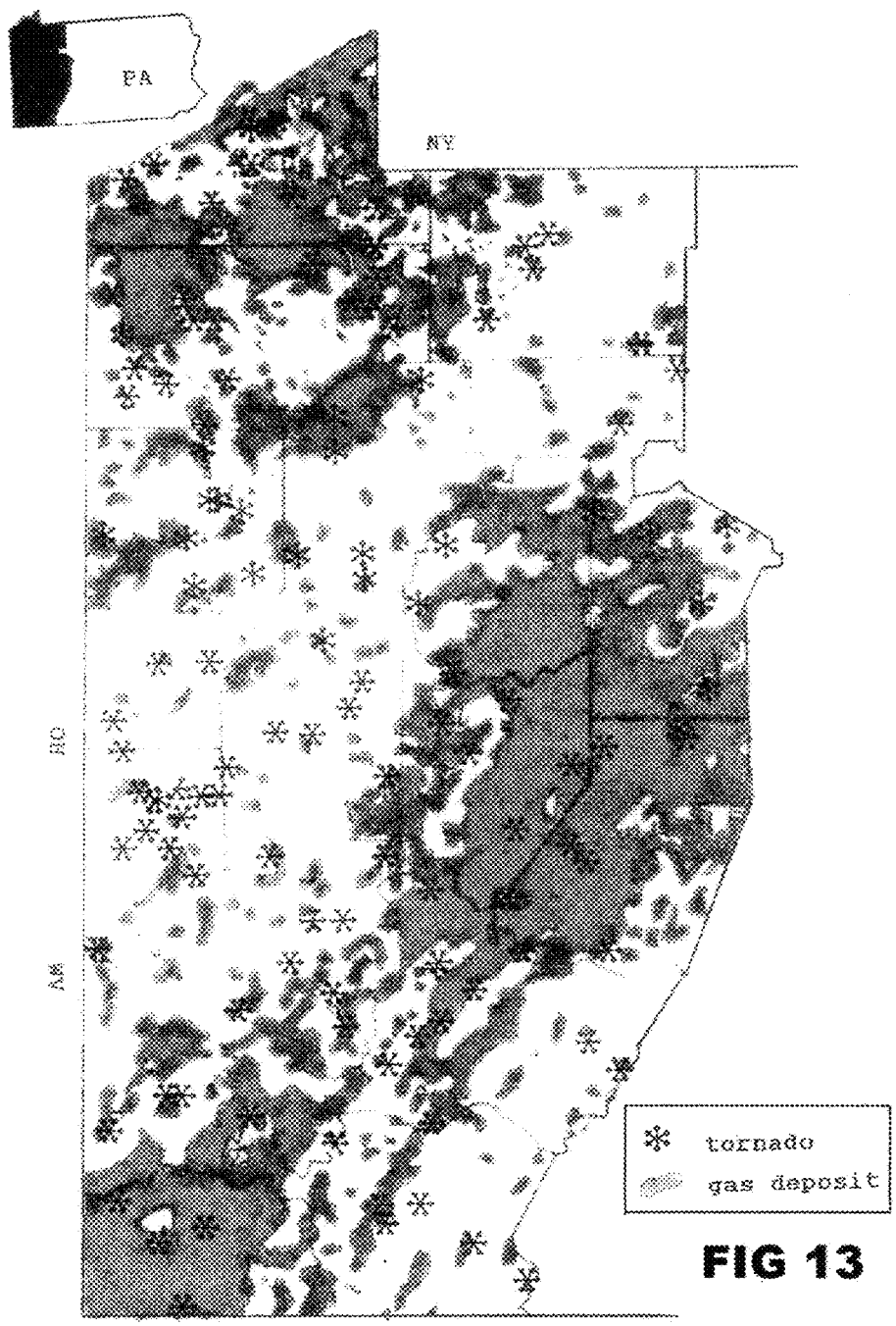
FIG. 13 shows gas deposits and tornado occurrences in Western Pennsylvania that were used in the statistical analysis performed by the Statistical Consulting Service of The Ohio State University.
Figure 14:
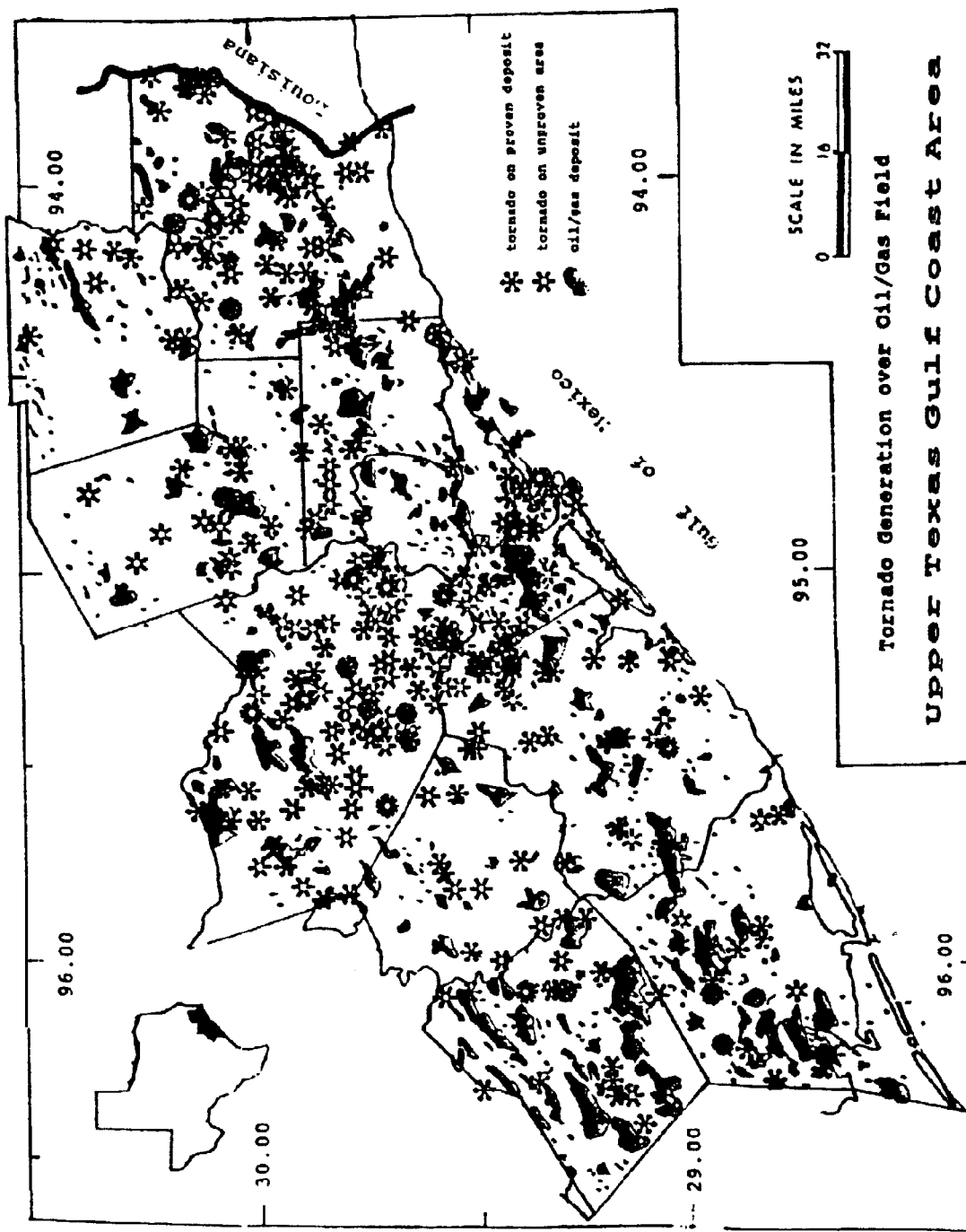
FIG. 14 illustrates tornado and gas deposits in the upper Texas Gulf Coast area as used in the Ohio State University statistical analysis.
Figure 15:
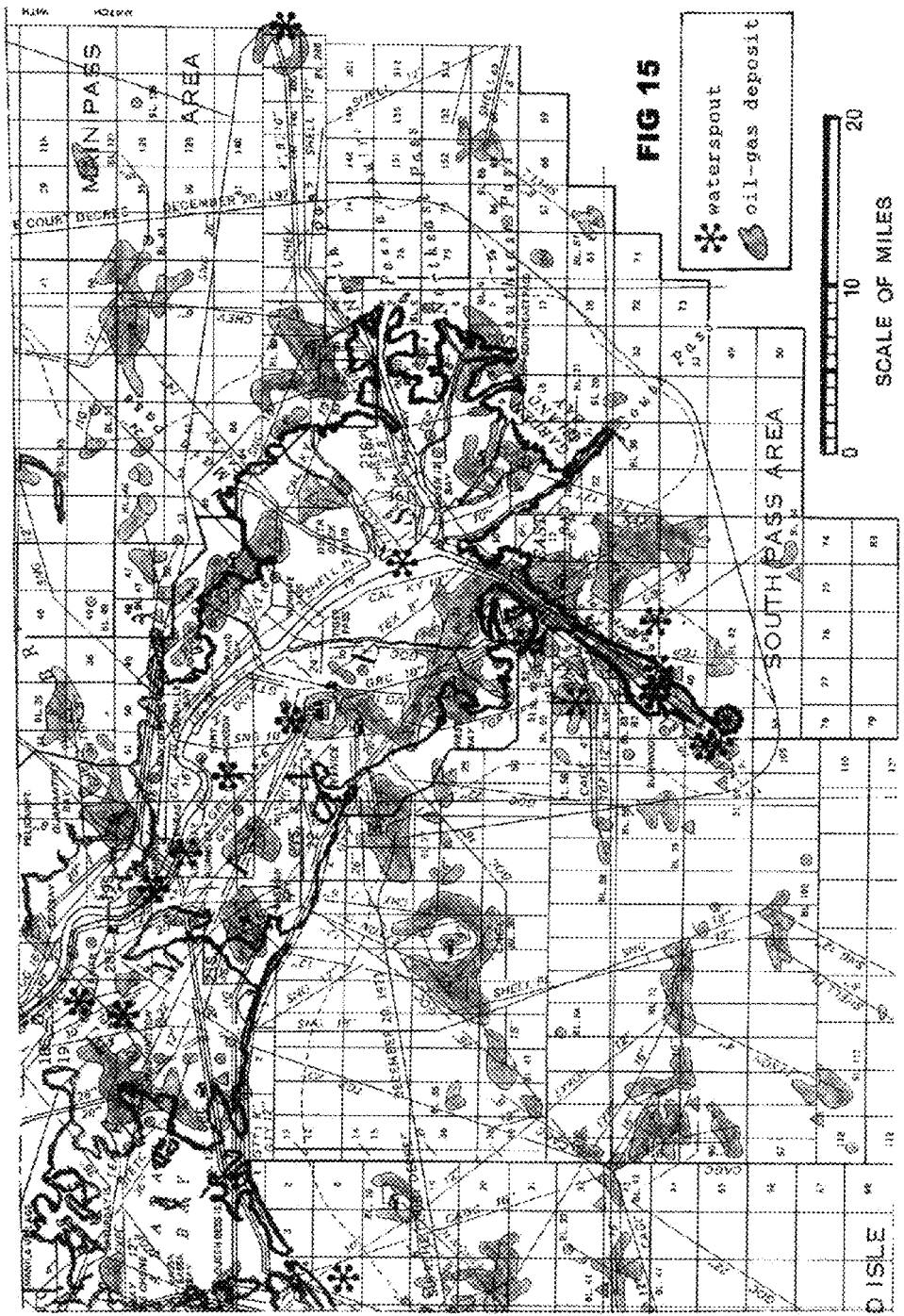
FIG. 15 illustrates waterspout and oil-gas deposits in the Mississippi Delta area as used in the Ohio State University statistical analysis.
Figure 16:
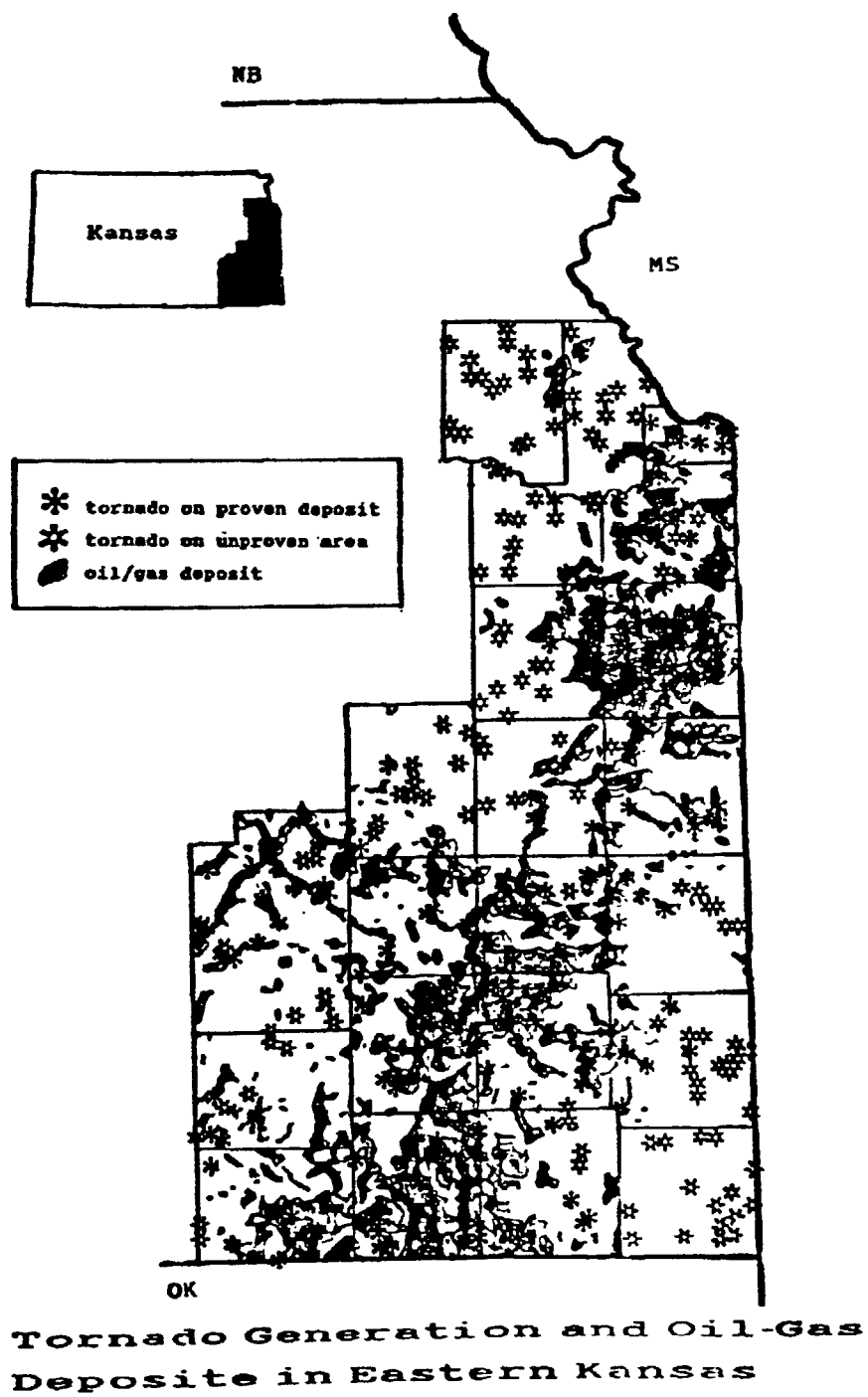
FIG. 16 shows the occurrence of tornados and oil/gas deposits in Eastern Kansas.

It is also possible that the severe weather can originate without the formation of a negatively charged air mass that rises from the ground as noted above. As shown in FIG. 12, a deposit of oil and gas (petroleum) 110 in underground strata 112 promotes various chemical and electrical phenomena. Hydrocarbons, especially methane, in petroleum deposit 110 are in a state of upward movement through the ground 112 into the atmosphere 120 in the form of hydrocarbon vapor or particulate matter rather than negatively ionized gases. In the course of upward diffusion through the ground strata 112, the hydrocarbons enter into a redox reaction with a steady flux of oxygen supplied from the atmosphere 120 in counter downward diffusion through the ground 112 towards the deposit 110. This results in a formation of a localized positive ground surface, that is, as an anodic ground region above the petroleum deposit 110.

When a thunderstorm cloud 122, typically having a disc-like anvil cloud 124 horizontally stretched at its upper surface and giving rise to precipitation 130 from its forward portion, approaches and crosses the localized anodic ground, region, an electrostatic proximity effect induces an electric dipole vertically in the cloud body with a negative charge region immediately above the positively charged ground surface region. As a consequence of the induced dipole, an electrically attractive downward force acts against the upward buoyancy of the cloud causing the negatively charged cloud base to project downward for form wall cloud 132. As a result of various forces, the wall cloud 132 begins to rotate slowly giving rise to a funnel projecting downward from the center of the wall cloud 132. The funnel can be drawn down further until it develops into a tornado 136 actually touching the ground. In addition, multiple lightning strikes are likely to occur to neutralize electrically the electrostatic potential existing between the cloud and ground.

In short, a petroleum deposit forms a gigantic fuel cell with the petroleum deposit serving as a hydrocarbon source and above ground air as an oxygen source. As the petroleum diffuses upwardly from the petroleum deposit, a negative site is formed around the petroleum deposit and a localized positive ground surface area is formed above the petroleum deposit, in effect, forming a huge underground combustion column. The localized positive ground surface area induces a negative region at the bottom of an overpassing storm cloud by an electrical proximate effect. Energy is released between the cloud bottom and the ground region in the form of lighting or the formation of a small region of high shear associated with tornados and similar phenomena.

It is to be understood that although the present invention has been specifically disclosed with the preferred embodiment and examples, modifications to the process may be apparent to those skilled in the art and such modifications and variations are considered to be within the scope of the invention and the appended claims. It is also intended that all matter contained in the above description shall be interpreted as illustrative and not in a limiting sense, the scope of the invention being indicated by the appended claims rather than by the foregoing description, and all changes that come within the meaning and range of equivalency of the claims are therefore intended to be embraced therein. That is, the following claims are intended to cover all of the generic and specific features of the invention herein described, and all statements of the scope of the invention which, as a matter of language, fall therebetween.

Tornado Occurrence Study: A Comparison of Mean Incidence in Petroleum Rich and Petroleum Lean Areas Robert M. Leighty, Ph.D.

Statistical Consulting Service

Ohio State University, Columbus, Ohio

The purpose of this study is to compare the mean incidence of tornadoes in the petroleum rich and petroleum lean areas. The data used in the analysis are the mean incidence of tornado occurences in the petroleum rich and lean areas, recorded for each of 8 counties located in the vicinity of the Denver metropolitan area (appended). These concentrations are in numbers of tornadoes per 100 kilometers squared. Because counties vary with respect to tornado occurences, pairs of measurements in each county are correleated, and hence, the differences, concentration in rich areas minus concentration in lean area, were analyzed.

Data collected on counties may exhibit non-standard features. The errors may not possess a normal distribution, or the errors may be spatially correlated with measurements being more strongly correlated for counties that are located more closely together. Four different analyses were performed to address these non-standard features. An alternative analysis, that wasn't performed, is a random-effects Poisson Regression analysis on the actual counts of tornadoes. Instead, analyses that were appropriate for data of the form of mean incidence were performed. These analyses were:

1. A paired t-test that is appropriate if the residuals associated with the differences are normally distributed and are independent, not spatially correlated, 2. Two nonparametric tests, the Sign test and the Wilcoxon signed-rank test, that are appropriate if the residuals associated with the differences are not normally distributed, and 3. A test that is based on a model that accounts for possible spatial correlation.

The qualitative conclusion were the same for all four tests. The null hypothesis was that there was no difference in mean tornado incidence in the two areas, petroleum rich, and petroleum lean. The research hypothesis is that a difference in mean concentrations exist. This can also be formulated as the mean difference being equal or not equal to 0.

$H_0: \mu_{rich} = \mu_{lean}$  $H_0: \mu_{difference} = 0$ versus
$H_1: \mu_{rich} \neq \mu_{lean}$  $H_1: \mu_{difference} \neq 0$ The P values associated with the four tests were as follows:

| Test | test Statistic | P value |
|---|---|---|
| Paired t-test | 4.216 | 0.0040 |
| Sign test | 4 | 0.0078 |
| Wilcoxon Signed-Rank Test | 18 | 0.0078 |
| T-test that assumes spatial correlation | 4.16 | 0.0042 |

All tests resulted in P values that were less than 0.01, and hence, all are highly significant suggesting it is very unlikely that no difference in mean incidence exist. A P value of 0.004 is interpreted to mean that if there were no difference in mean concentrations, and samples were repeatedly taken from similar populations, then one would expect only 4 in 1000 samples to produce mean differences as large as the mean difference observed in our data. A more plausible explanation is that a difference in mean concentration actually exists.

The mean difference is estimated to be 0.58 and a 95% confidence interval for this mean difference is (0.2507, 0.9111). Hence we are 95% confidence that the mean incidence of tornadoes per 1000 $km^2$ is between 0.25 and 0.91 larger in the petroleum rich area than in the petroleum lean area.

The data and the tests are briefly described in appendix 1. The printouts for the analyses are provided in appendix 2.

Appendix 1

The Data:

| County | Petroleum Rich | Petroleum Lean | Difference |
|---|---|---|---|
| 1 | 1.8 | 0.42 | 1.38 |
| 2 | 1.16 | 0.6 | 0.56 |
| 3 | 0.55 | 0.48 | 0.07 |
| 4 | 0.66 | 0.28 | 0.38 |
| 5 | 0.62 | 0.08 | 0.54 |
| 6 | 1.18 | 0.37 | 0.81 |
| 7 | 0.68 | 0.37 | 0.31 |
| 8 | 0.7 | 0.09 | 0.61 |
| 9 | 0.93 | — | — |
| 10 | 1.66 | — | — |
| 11 | 1.4 | — | — |

Data for three counties are missing, so the analysis was performed on the differences for the first 8 counties.

The Tests:

The first three tests, the paired t-tests and the two nonparametric tests are standard and descriptions of the tests can be found in any introductory statistics text and in introductory nonparametric statistics texts (Conover(1971), Lehman (1975).

The paired t tests is a standardized mean difference.

The sign test merely counts the number of differences that exceed 0. In this case all 8 do, and the probably of either getting all 8 above 0 or all 8 below 0, is $2(0.5^8) = 0.0078125$, under the null hypothesis of no difference. This test only assumes that the differences come from some continuous distribution, and that they are independent.

The Wilcoxon sign-rank test, is based on the sum of the ranks of the differences that exceed 0. In this case all exceed 0, so the statistic is the sum of the numbers from 1 to 8 or 8(9)/2=36. This test assumes that if the mean difference is not 0, the distributions of the difference come from a continuous distribution that has been shifted away from 0. This is a slightly stronger assumption than is made for the sign test.

The software package procedure, SAS univariate, reported half the value of the test statistics, perhaps because two-sided tests were performed. The values 4 and 18 were reported rather than the values 8 and 36.

The last test is a t-test that is based on a model that assumes the errors associated with the differences are not independent, but are spatially correlated.

$$y_i = \mu + \epsilon_i$$

where the covariance between the errors associate with differences $y_i$ and $y_j$ which are a distance of $d_{ij}$ apart is $$Cov(\epsilon_i, \epsilon_j) = \sigma^2 \exp(-d_{ij}/p)$$

The tests are then based on the approximate t distribution associated with the standardized mean difference. The SAS procedure MIXED was used to perform this analysis.

Reproducibility of the Association: The Analysis of Data from Four Other States

Similar data that compares the incidence of tornadoes in oil or gas lean and rich areas was made available to me by Dr. Mori. He has data in four other states, Western Pennsylvania, Northern Texas, Louisiana, and Kansas (attached). In Pennsylvania 17 out of 18 counties revealed Higher concentrations tornadoes appearing in oil/gas rich areas. In Texas, 11 out of 11 counties revealed higher concentrations. In Louisiana, it was not broken up by county, but there was a much higher concentration of waterspouts in the Mississippi Delta. And 18 of the 21 counties in Kansas where a comparison is possible resulted in a higher frequency of tornadoes in oil/gas rich areas. The sign test for the median difference being 0, no difference in concentrations, were, of course significant for the Pennsylvania, Texas, and Kansas data. P values for the one-sided Sign tests were 0.517=7.629395e-06, 0.511=0.0004882812, and 1-pbinom(17,21,0.5) 0.0007448196 respectively. In sum, the phenomenon is reproduced in all the different states that Dr. Mori has been able to find available data.
 1-pbinom(10,11,0.5) [1] 0.0004882812
 >1-pbinom(17,21,0.5) [1] 0.0007448196

Tornadoes are Location-Specific Phenomena: A Test for Randomness of Occurences in Texas I examined four counties in Texas, Orange, Jefferson, Brazoria, and Wharton which Dr. Mori uses to illustrate the non random nature of tornado occurences. The area of Orange county, for instance, is 414 square miles. Tornado points may be differentiated by 1 square mile areas. Hence there are approximately 414=414/1, possible square areas in which tornadoes could occur. Over a period of time, 19 tornadoes were sighted in this county. The pattern of occurences display a peculiar non random pattern, in that there was one area where multiple tornado sightings occurred. In fact, tornadoes were sighted on a single one-mile square area 5 times. The other three counties had single areas with multiple sightings also (four sightings in one area). The argument against randomness is based on just how unlikely it is to see this pattern of tornado occurences, where in a single location there are 4 or 5 repeated sightings.

How unlikely is this pattern of finding four counties in Texas, each county possessing a single one-square mile area with 4 or 5 tornado sightings? Under the assumption of random occurences, the number of occurences $x_i$, in location i, i=1.414, over a fixed period of time may be assumed to possess a Poisson distribution. The assumptions leading to a Poisson distribution are satisfied. Furthermore, under the assumption of random tornado occurences, each random variable $x_i$ may be assumed to be independent and identically distributed. The best fitting Poisson distribution, is the distribution associated with the maximum likelihood estimate for the mean $\lambda = 19/414 = 0.04589372$. The probability of observing a count that is greater than or equal to 5 is $$p = P(X_i \geq 5) = 1 - P(X_i \leq 4) = 1 - (\exp(-\lambda)(1 + \lambda + \lambda^2/2) + \lambda^3/6 + \lambda^4/24) = 1.632994e-09.$$

The probability of observing at lease one such location out of the 414 possible locations is approximately the binomial cumulative probability, $q = P(Z \geq 1) = 1 - P(Z \leq 0) = 1.632994e-09$. Similarly, the chance of this rate event, q, where a single area has 4 or more sightings may be calculated for the other three counties:

| County | mean rate | p | q |
|---|---|---|---|
| Orange | 0.04589 | 1.633e−09 | 6.761e−07 |
| Jefferson | 0.06911 | 8.996e−07 | 1.054e−03 |
| Brazoria | 0.02309 | 1.163e−08 | 1.964e−05 |
| Wharton | 0.02337 | 1.219e−08 | 5.049e−06 |

Note that the largest probability of this rare event occurred in Jefferson county, where the probability of four or more sightings occurring in a single one-square-mile area is 0.00105=1.054e-03. The chance of at 4 or more counties in the state of Texas exhibiting such rare single-location multiple-sighting occurences of tornadoes is also extremely improbable. The probability would be no bigger than the cumulative binomial probability of seeing four or more counties when the number of trials is 254 and the success parameter is 0.00105.

The probability of this event would be smaller than $P(X \geq 4) = 0.000169$. This suggests that tornado sightings are not random, and may be influenced by another location-specific factor, such as, for instance, a geological factor.

Appendix 2

SAS Printouts

The printouts from PROC UNIVARIATE, that performs the first three tests:

| Moments | | | |
|---|---|---|---|
| N | 8 | Sum wgts | 8 |
| Mean | 0.5825 | Sum | 4.66 |
| Std Dev | 0.390741 | Variance | 0.152679 |
| Skewness | 1.135914 | Kurtosis | 2.20947 |
| USS | 3.7832 | CSS | 1.06875 |
| CV | 67.08001 | Std Mean | 0.138148 |

-continued

| Moments | | | | |
|---|---|---|---|---|
| T:Mean = 0 | 4.216498 | Pr > |T| | 0.0040 | <--* |
| Num^ = 0 | 8 | Num > 0 | 8 | |
| M(Sign) | 4 | Pr >= |N| | 0.0078 | <--* |
| sgn Rank | 18 | Pr >= |S| | 0.0078 | <--* |

The printouts from PROC MIXED, that performs the last test: that assumes spatial correlation.

| Iteration | Evaluations | Objective | Criterion |
|---|---|---|---|
| 1 | 2 | −4.08100125 | 0.00000000 | convergence criteria met.

| R Matrix for ONE 1 | | | | |
|---|---|---|---|---|
| Row | COL1 | COL2 | COL3 | COL4 |
| 1 | 0.15304479 | 0.00003987 | 0.00015147 | 0.00000108 |
| 2 | 0.00003987 | 0.15304479 | 0.00007056 | 0.00032738 |
| 3 | 0.00015147 | 0.00007056 | 0.15304479 | 0.00015147 |
| 4 | 0.00000108 | 0.00032738 | 0.00015147 | 0.15304479 |
| 5 | 0.00001389 | 0.00032738 | 0.00403958 | 0.00569806 |
| 6 | 0.00000000 | 0.00000001 | 0.00000000 | 0.00000000 |
| 7 | 0.00000185 | 0.00000689 | 0.00000002 | 0.00000002 |
| 8 | 0.00053225 | 0.00011235 | 0.00000293 | 0.00000035 |

| R Matrix for ONE 1 | | | | |
|---|---|---|---|---|
| Row | COL5 | COL6 | COL7 | COL8 |
| 1 | 0.00001389 | 0.00000000 | 0.00000185 | 0.00053225 |
| 2 | 0.00032738 | 0.00000001 | 0.00000689 | 0.00011235 |
| 3 | 0.00403958 | 0.00000000 | 0.00000002 | 0.00000293 |
| 4 | 0.00569806 | 0.00000000 | 0.00000002 | 0.00000035 |
| 5 | 0.15304479 | 0.00000000 | 0.00000002 | 0.00000132 |
| 6 | 0.00000000 | 0.15304479 | 0.00010904 | 0.00000064 |
| 7 | 0.00000002 | 0.00010904 | 0.15304479 | 0.00053225 |
| 8 | 0.00000132 | 0.00000064 | 0.00053225 | 0.15304479 |

| Covariance Parameter Estimates (REML) | | | | |
|---|---|---|---|---|
| Cov Parm | Ratio | Estimate | Std Error | Z |
| DIAG SP(EXP) | 1.98566430 | 0.30389557 | 1.38223030 | 0.22 |
| Residual | 1.00000000 | 0.15304479 | 0.08228453 | 1.86 |

| Covariance Parameter Estimates (REML) |
|---|
| Pr > |Z| |
| 0.8260 |
| 0.0629 |

| Model Fitting Information for DIFF | |
|---|---|
| Description | Value |
| Observations | 8.0000 |
| Variance Estimate | 0.1530 |
| Standard Deviation Estimate | 0.3912 |
| REML Log Likelihood | −4.3921 |
| Akaike's Information Criterion | −6.3921 |
| Schwarz's Bayesian Criterion | −6.3380 |
| −2 REML Log Likelihood | 8.7841 |
| PARMS Model LRT Chi-Square | 0.0000 |
| PARMS Model LRT DF | 1.0000 |
| PARMS Model LRT P-Value | 0.9978 |

| Solution for Fixed Effects | | | | | |
|---|---|---|---|---|---|
| Parameter | Estimate | Std Error | DDF | T | Pr > |T| |
| *-->INTERCEPT | 0.58090795 | 0.13964418 | 7 | 4.16 | 0.0042 |

But this is almost identical to a paired t-test. There is very little evidence of spatial correlation for the differences, and hence, the comparison that accounts for spatial correlation, agrees with the paired t-test.

| ESTIMATE Statement Results | | | | | |
|---|---|---|---|---|---|
| Parameter | Estimate | Std Error | DDF | T | Pr > |T| |
| mean diff | 0.58090795 | 0.13964418 | 7 | 4.16 | 0.0042 |
| | Alpha | Lower | Upper | | |
| *--> | 0.05 | 0.2507 | 0.9111 | | |

REFERENCES

Conover, W. J., (1971): *Practical Nonparametric Statistics*, John Wiley & Sons Inc., New York.

Lehmann, E. L., (1975): *Nonparametrics: Statistical Methods Based On Ranks*, Holden-Day Inc., San Francisco, Calif.

| TORNADO OCCURRENCE CONCENTRATION (occurrence/100 km$^2$) oil/gas-rich and oil/gas-lean regions in counties of Western Pennsylvania, Upper Texas, and Mississippi Delta in Louisiana | | |
|---|---|---|
| county | gas-rich | gas-lean |
| Pennsylvania (western) | | |
| Allegheny | 1.13 | 0.19 |
| Armstrong | 4.55 | 0.29 |
| Beaver | 1.54 | 0.93 |
| Butler | 0.61 | 0.27 |
| Clarion | 0.17 | 0.17 |
| Crawford | 1.84 | 0.14 |
| Erie | 0.65 | 0.21 |
| Fayette | 1.03 | 0.10 |
| Forest | 0.53 | 0.09 |
| Green | 0.29 | 0.00 |
| Indiana | 0.31 | 0.24 |
| Jefferson | 0.37 | 0.00 |
| Lawrence | 2.00 | 0.21 |
| Mercer | 1.46 | 0.20 |
| Venango | 0.99 | 0.07 |
| Warren | 0.46 | 0.10 |
| Washington | 0.35 | 0.08 |
| Westmoreland | 1.11 | 0.16 |
| Total | 19.39 | 3.35 |
| Ave. | 1.26 | 0.136 |
| Texas (upper) | | |
| Bratoria | 7.56 | 0.02 |
| Chambers | 1.58 | 0.29 |
| Fort Bend | 2.52 | 0.33 |
| Galveston | 14.42 | 1.71 |
| Hardin | 5.88 | 0.08 |
| Harris | 14.85 | 1.48 |
| Jefferson | 22.34 | 1.33 |
| Liberty | 10.08 | 0.21 |
| Matagorda | 3.19 | 0.15 |

-continued

| | | |
|---|---|---|
| Orange | 22.00 | 0.59 |
| Wharton | 4.62 | 0.26 |
| Total | 109.04 | 6.45 |
| Ave. | 9.91 | 1.17 |
| Louisiana (Mississippi Delta) | | |
| Plaguemines | 1.85 | 0.046 |
| Ave. | 1.85 | 0.046 |
| | (waterspout only) | |

1. Oil and gas deposits are considered as geolog. data in Texas and Louisiana, but gas deposits data only considered in Pennsylvania. Addition of oil data for the state is not expected. to change the results significantly.
2. The oil/gas geolog. data are acquired here from Oil & Gas Fields of United States. 2nd ed., PennWell Maps
3. The tornado data for Mississippi Delta employs waterspouts data only.
4. Generally, relatively thorough oil/gas geolog. data in US are available to limited areas in limited states. The data provided here are chosen, as typical representative geolog.-meteolog. data, among such limited available portions from Colorado, Pennsylvania, Texas, Louisiana, and Kansas.
5. Ambiguous and erroneous data are omitted from this analysis.

TORNADO OCCURRENCE CONCENTRATION
(occurrence/100 km$^2$)
--in oil/gas-rich and oil/gas-lean regions
in counties of eastern Kansas--
Kansas (eastern)

| county | oil/gas-rich | oil/gas-lean |
|---|---|---|
| Allen | 11.76 | 0.10 |
| Anderson | 2.08 | 0.56 |
| Bourbon | 3.12 | 0.76 |
| Chautauqua | 0.74 | 0.34 |
| Cherokee | N/A* | 0.86 |
| Coffey | 0.39 | 1.25 |
| Crawford | 5.87 | 1.13 |
| Douglas | 1.56 | 1.65 |
| Elk | 4.69 | 0.74 |
| Franklin | 3.13 | 1.00 |
| Greenwood | 2.53 | 6.41 |
| Jefferson | 2.33 | 1.40 |
| Johnson | 4.93 | 0.16 |
| Labatt | 1.93 | 0.36 |
| Leavenworth | 1.76 | 1.32 |
| Linn | 1.64 | 0.10 |
| Miami | 1.29 | 0.00 |
| Montgomery | 1.41 | 0.45 |
| Neosho | 2.34 | 0.00 |
| Wilson | 1.34 | 0.00 |
| Woodson | 1.17 | 0.00 |
| Wyandotte | 5.88 | 0.00 |

*there is no oil/gas-rich (deposit-proven) region in this county.

I claim:

1. A method for determining the probable location of underground petroleum comprising the steps of:
   a) monitoring weather phenomena in an area designated for petroleum exploration;
   b) detecting a severe-weather phenomenon;
   c) locating the severe-weather inducing site associated with said severe-weather phenomenon; and
   d) using said severe-weather inducing site as a site for further petroleum exploration.

2. The method for determining the probable location of underground petroleum according to claim 1 wherein said severe-weather inducing site is located by using moving severe-weather phenomenon.

3. The method for determining the probable location of underground petroleum according to claim 2 wherein said moving severe-weather phenomenon is at least one severe-weather phenomenon selected from the group of severe-weather phenomena consisting of:
   a) a wall cloud or supercell;
   b) a funnel aloft;
   c) a tornado;
   d) a water spout; and
   e) a mesocylcone.

4. The method for determining the probable location of underground petroleum according to claim 3 wherein said moving severe-weather phenomenon is said tornado.

5. The method for determining the probable location of underground petroleum according to claim 3 wherein said moving severe-weather phenomenon is said funnel aloft.

6. The method for determining the probable location of underground petroleum according to claim 3 wherein said moving severe-weather phenomena is said wall cloud or supercell.

7. The method for determining the probable location of underground petroleum according to claim 3 wherein said moving severe-weather phenomenon is said water spout.

8. The method for determining the probable location of underground petroleum according to claim 3 wherein said moving severe-weather phenomenon is a mesocyclone.

9. The method for determining the probable location of underground petroleum according to claim 2 herein said weather inducing site is determined from a Doppler radar scan as the site of initial appearance of a tornado vortex signature.

10. The method for determining the probable location of underground petroleum according to claim 2 with said locating step further comprising the steps of:
   a) monitoring said severe-weather phenomenon as to position, velocity and acceleration with respect to ground surface;
   b) recording severe-weather data for said position, velocity and acceleration of said moving, severe-weather phenomenon; and
   c) extrapolating said data to said severe-weather-inducing site.

11. The method for determining the probable location of underground petroleum according to claim 10 wherein said monitoring of severe-weather phenomena step is carried out with Doppler radar.

12. The method for determining the probable location of underground petroleum according to claim 10 wherein said monitoring of severe-weather phenomena step is carried out with Doppler lidar.

13. The method for determining the probable location of underground petroleum according to claim 10 wherein said recording is carried out with visual recording means.

14. The method for determining the probable location of underground petroleum according to claim 10 wherein said monitoring and recording steps are carried out with visual recording means.

15. The method for determining the probable location of underground petroleum according to claim 1 wherein said severe-weather phenomena is a static severe-weather phenomenon.

16. The method for determining the probable location of underground petroleum according to claim 15 wherein said static severe-weather phenomenon is multiple, high-density, lightning ground strikes.

17. The method for determining the probable location of underground petroleum according to claim 16 with said locating step further comprising the steps of:
   a) monitoring each of said lightning ground strikes as to its ground strike location;
   b) recording lightning strike data as to each said ground strike location; and
   c) determining a ground area of highest ground strike location density.

18. The method for determining the probable location of underground petroleum according to claim 17 wherein said monitoring step is carried out with L-band radar.

19. The method for determining the probable location of underground petroleum according to claim 17 wherein said monitoring step is carried out with Doppler radar.

20. The method for determining the probable location of underground petroleum according to claim 15 wherein said monitoring step is carried out with atmospheric sounding sensors.

21. The method for determining the probable location of underground petroleum according to claim 1 wherein said further petroleum exploration is carried out by drilling a petroleum well at said severe-weather inducing site.

22. The method for determining the probable location of underground petroleum according to claim 21 further comprising the step of using another petroleum exploration technique for determining the probable location of petroleum prior to said drilling step.

23. The method for determining the probable location of underground petroleum according to claim 21 wherein said initial step of monitoring for at least one of said group of severe-weather phenomena is performed using a network of radar units.

\* \* \* \* \*